United States Patent
Shauh

(10) Patent No.: US 12,505,422 B2
(45) Date of Patent: *Dec. 23, 2025

(54) TELEPHONE CALL PURCHASE WITH PAYMENT USING MOBILE PAYMENT DEVICE

(71) Applicant: Jack Shauh, San Diego, CA (US)

(72) Inventor: Jack Shauh, San Diego, CA (US)

(73) Assignee: VRAY INC., San Diego, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 18/674,984

(22) Filed: May 27, 2024

(65) Prior Publication Data

US 2024/0311796 A1    Sep. 19, 2024

Related U.S. Application Data

(62) Division of application No. 17/583,993, filed on Jan. 25, 2022, now Pat. No. 12,045,798.

(51) Int. Cl.
| | |
|---|---|
| G06Q 40/00 | (2023.01) |
| G06Q 20/32 | (2012.01) |
| H04L 9/40 | (2022.01) |

(52) U.S. Cl.
CPC ....... *G06Q 20/326* (2020.05); *H04L 63/0485* (2013.01); *G06Q 20/3255* (2013.01)

(58) Field of Classification Search
CPC .............. G06Q 20/326; G06Q 20/3255; H04L 63/0485
See application file for complete search history.

(56) References Cited

U.S. PATENT DOCUMENTS

| | | | |
|---|---|---|---|
| 2008/0040265 A1* | 2/2008 | Rackley, III | G06Q 20/102 705/40 |
| 2010/0094752 A1* | 4/2010 | Heath | G06Q 20/40 705/40 |

(Continued)

FOREIGN PATENT DOCUMENTS

| | | | | |
|---|---|---|---|---|
| WO | WO-2017081639 A2 * | 5/2017 | | G06Q 20/401 |

OTHER PUBLICATIONS de Luna et al: "Mobile payment is not all the same: The adoption of mobile payment systems depending on the technology applied", Technological Forecasting and Social Change vol. 146, Sep. 2019, pp. 931-944 (Year: 2019).*

*Primary Examiner* — Edward J Baird
(74) *Attorney, Agent, or Firm* — Parsons & Goltry; Robert A. Parsons; Michael W. Goltry

(57) ABSTRACT

A mobile payment method includes making a mobile payment request an automated response system of a merchant store for a purchase. A mobile number of a mobile device is provided to the automated response system. Payment information including the mobile number and a payment amount is sent from the automated response system to the mobile payment server. A Uniform Resource Locator (URL) link is created by the mobile payment server and contains transaction information. The URL link is sent to the mobile device where a customer selects the URL link to set up a Hypertext Transfer Protocol Secure (HTTPS) session. A program script is downloaded. A payment transaction is confirmed by the mobile device which generates and sends encrypted payment data to a payment network through the mobile payment server.

9 Claims, 17 Drawing Sheets

(56) References Cited

U.S. PATENT DOCUMENTS

| | | | | |
|---|---|---|---|---|
| 2012/0185398 | A1* | 7/2012 | Weis | G06Q 20/4015 |
| | | | | 705/16 |
| 2013/0256403 | A1* | 10/2013 | MacKinnon Keith | ........................ |
| | | | | G06Q 20/322 |
| | | | | 235/375 |
| 2013/0317923 | A1* | 11/2013 | Capps | G06Q 20/12 |
| | | | | 705/16 |
| 2013/0317928 | A1* | 11/2013 | Laracey | G06Q 20/3552 |
| | | | | 705/41 |
| 2016/0203463 | A1* | 7/2016 | Bae | G06Q 20/42 |
| | | | | 705/65 |
| 2016/0328700 | A1* | 11/2016 | Bortolotto | G06Q 20/326 |
| 2017/0076274 | A1* | 3/2017 | Royyuru | G06Q 20/18 |
| 2017/0193499 | A1* | 7/2017 | Kusnanto | H04L 63/18 |
| 2017/0243195 | A1* | 8/2017 | Xing | G06Q 20/0855 |
| 2018/0025334 | A1* | 1/2018 | Pourfallah | G06Q 20/14 |
| | | | | 705/41 |

\* cited by examiner

TELEPHONE CALL PURCHASE WITH PAYMENT USING MOBILE PAYMENT DEVICE

CROSS-REFERENCE TO RELATED APPLICATION

This application is a Divisional Application of Continuation-in-Part application Ser. No. 17/583,993, filed 25 Jan. 2022, which claims the benefit of U.S. Non-Provisional application Ser. No. 15/903,458, filed 23 Feb. 2018, which claims the benefit of U.S. Provisional Application No. 62/463,567, filed 24 Feb. 2017.

FIELD OF THE INVENTION

This invention relates to mobile payment systems.
More particularly, the present invention relates to mobile payment for telephone purchases.

BACKGROUND OF THE INVENTION

In the payments industry, mobile payments systems are becoming more widely used. Mobile payment applications as a virtual credit/debit card are starting to be provided to mobile devices such as smart phones, tablets, watches and other wearable devices, and the like. Mobile payment methods currently include Apple Pay, Android Pay, Samsung Pay etc. As an example, a mobile device capable of mobile payment, can be used in a point of sale (POS) terminal to pay for a sale in a retailer store. Mobile payment can provide strong security to prevent fraud by implementing EMV (Europay, MasterCard and Visa) Integrated Circuit Card Specifications for Payment Systems. Furthermore, mobile payment can provide strong security by implementing EMV Payment Tokenization Specifications, or a vendor specific payment token scheme.

However, if a merchant's web site is unavailable or not well known for purchase & payment, it must rely on telephone calls to take orders and payment information. While considered antiquated and inefficient, many businesses still rely on passing credit card information verbally during a telephone call to complete a sale. To pay, the customer needs to verbally give the credit information, e.g. card number, billing address, to a clerk or shop keeper on the other end of the telephone line. This is an error prone, unsecure and time-consuming process.

Another method employs interactive voice response (IVR) systems for a transaction. In this case, a customer using a phone device enters information to the IVR system by voice or using the telephone keypad tones. The information typically includes card number and verification information. With the provided card information, the IVR system can send an authorization request to a payment network to authorize the transaction. The IVR system can then relay the payment result to the customer's phone device. While somewhat effective, the above process relies on providing the card number which is a security risk, is cumbersome as it requires customers to enter or speak multiple times to provide card information, and is not secured as it gives card information to the merchant.

It would be highly advantageous, therefore, to remedy the foregoing and other deficiencies inherent in the prior art.

SUMMARY OF THE INVENTION

Briefly, to achieve the desired objects and advantages of the instant invention, provided is a mobile payment method including the steps of providing a merchant, providing a mobile device having mobile payment capability, providing a server coupled to a payment network, and providing a merchant computing device coupled to the server. A purchase is requested by a customer from the merchant. A purchase identification associated with the purchase is inputted into the merchant computing device and forwarded with payment information to the server. Mobile payment communication is established between the mobile device and the server using the purchase identification. A mobile payment for the purchase is made from the mobile device to a payment network through the server.

In specific applications, the purchase identification is associated with the purchase by communicating with the customer to obtaining a mobile identity of the mobile device for use as the purchase identification and inputting the mobile identity into the merchant computer. Establishing communication between the mobile device and the server includes the steps of the server establishing communication with the mobile device using the mobile identity to communicate with the mobile device associated with the purchase.

Inputting a purchase identification into the merchant computing device can include requesting a passcode from the server associated with the purchase from the merchant. The server generates the passcode associated with the purchase. The merchant computing device receives and displays the generated passcode from the server. The merchant communicates the passcode to the customer and the customer inputs the passcode into the customer mobile device. Alternatively, the mobile device requests the passcode generated by the server and the passcode is communicated to the merchant by the customer.

Also provided is a mobile payment system. The mobile payment system includes a merchant, a mobile device having mobile payment capability, a server couplable to a payment network, and a merchant computing device couplable to the server. A purchase request is made of the merchant and a purchase identification is associated with the purchase. The purchase information is entered into the merchant computing device and the purchase identification is sent to the server with payment information. Mobile payment communication is established between the mobile device and the server using the purchase identification and a mobile payment for the purchase is made from the mobile device to a payment network through the server.

Further provided is a mobile payment method including making a mobile payment request by a customer to an automated response system of a merchant store for a purchase, providing, by the customer, a mobile number of a mobile device, having mobile payment capability, to the automated response system and establishing communication, by the automated response system, to a mobile payment server coupled to a payment network. The mobile payment server is programmed to effectuate the operations of receiving payment information including the mobile number and the payment amount from the automated response system, creating a Uniform Resource Locator (URL) link, the URL link containing transaction information including information required by a mobile wallet Application Programming Interface (API) used in the transaction, sending the URL link to the mobile device, using the URL link to establish a Hypertext Transfer Protocol Secure (HTTPS) session with the mobile device, downloading a program script and validation token to the mobile device in the HTTPS session, and receiving encrypted payment data from the mobile device and sending the encrypted payment data to the payment network.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 1:
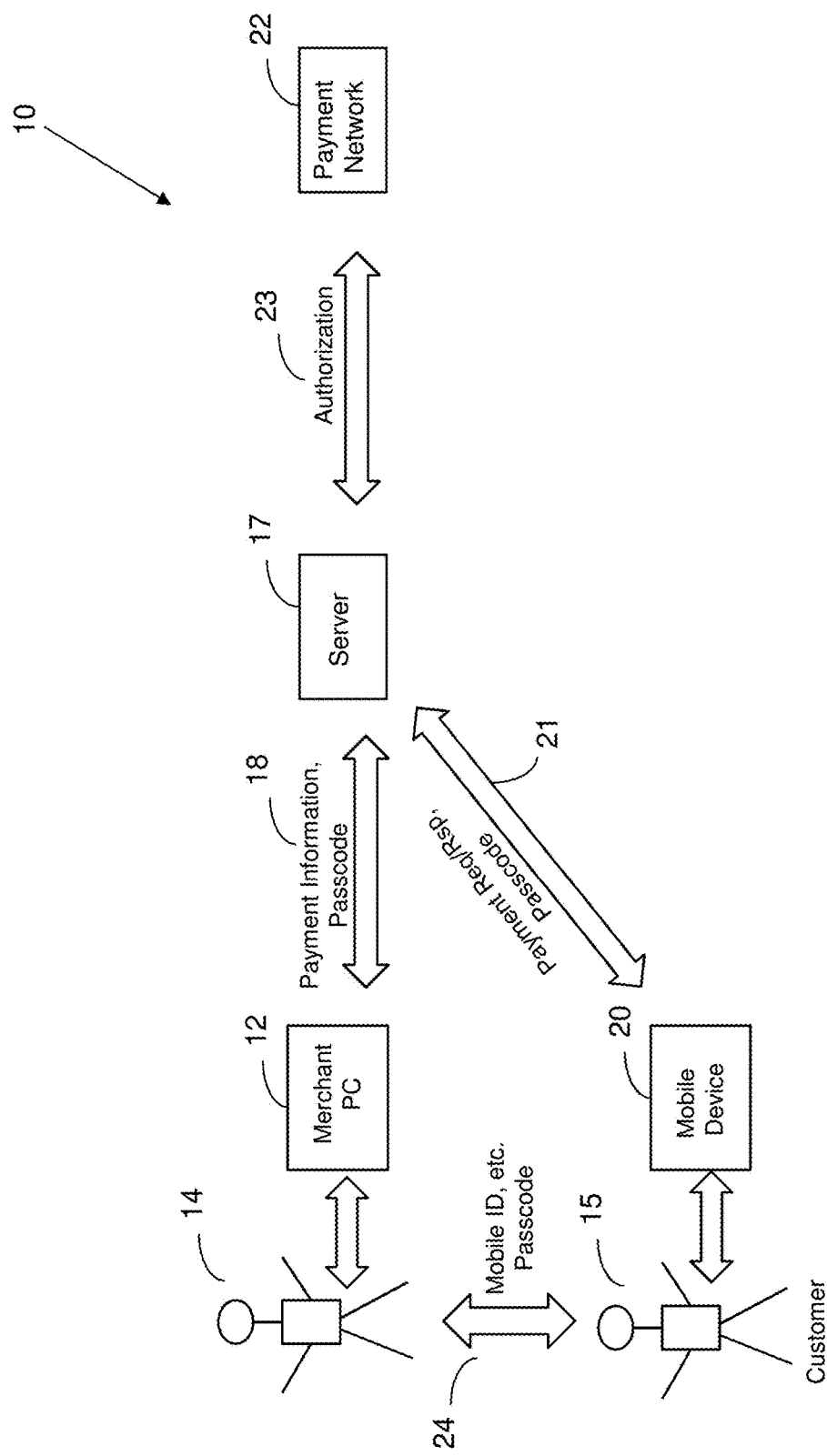
FIG. 1 is simplified block diagram of a payment system according to the present invention.

Turning now to the drawings in which like reference characters indicate corresponding elements throughout the several views, attention is first directed to FIG. 1 which is a block diagram of a mobile payment system 10 according to the present invention. System 10 includes a merchant computing device (merchant PC) 12 used by a merchant 14 to process an order and payment information from a customer 15. Merchant PC 12 can connect to a server 17 along a communication line 18. Communication line 18 can be any method that couples a computing device to a server, either hardwired or remotely, including networks such as the world wide web and the like. Merchant PC 12 can be any browser capable device such as a desktop computer, a laptop computer, a tablet computer, etc., capable of communicating with server 17 to initiate processing of a payment on purchase, and transfer purchase information. It will also be understood that merchant PC 12 can be a system consisting of multiple computing devices capable of communication with server 17. In this case, merchant PC 12 is either incapable of receiving mobile payments, or receiving mobile payment is undesirable with that specific device. A mobile device 20 is used by customer 15 to provide credit card or debit card payment information to merchant 14. The Mobile Device may be a smart phone, a tablet, or a wearable device capable of mobile payment which may be Apple Pay, Android Pay, Samsung Pay, or EMV. However, since merchant PC 12 cannot accept mobile payments or merchant 14 does not allow mobile payments through merchant PC 12, server 17 is couplable to mobile device 20 as illustrated by communication line 21, and is used to connect between merchant PC 12 and customer's mobile device 20 to relay payment request and response. Server 17 is in communication with a payment network 22 as illustrated by a communication line 23 to process payments received from mobile device 20. Server 17 can be a 3rd party server or can be owned by merchant 14. Merchant 14, through a clerk, and customer 15 are in communication through communication line 24. This communication can be by directly communicating in person, or through a communication device such as a telephone, cell phone, email, texting, instant messaging, and the like.

In this system, merchant 14, through a clerk, and customer 15 pass purchase and contact information through communication line 24. In particular, they communicate a purchase identification. For example, customer 15 communicates to merchant 14 a mobile identity of mobile device 20. Mobile identity is one instance of a purchase identification (purchase ID). Purchase ID is associated with a specific purchase. In one instance, the purchase ID associates a specific mobile device with a purchase from merchant 14. One of these, mobile identity, is information designating mobile device 20, such as a telephone number and the like. Mobile identity is used herein to establish a means of communicating with the mobile device, and associate the mobile device with the purchase. Mobile identity can also include email, texting, instant messaging and the like. Merchant 14 manually inputs the mobile identity into merchant PC 12 which then sends the mobile identity and payment information related to the purchase by communication line 18 to server 17. Server 17 then forwards payment request 26 to mobile device 20 to authorize payment. Server 17 identifies the correct mobile device associated with the purchase and establishes mobile payment communication line 21 using the mobile identity received from merchant PC 12. Conventional mobile payment protocols can then be followed between mobile device 20 using mobile payment, server 17 and payment network 22.

In another method, server 17 can generate a unique transaction passcode which serves as the purchase ID. This passcode is sent to merchant PC 12 as associated with the purchase. For example, the passcode can be 5 alphanumerical digits. Merchant 14, through a clerk, can communicate the transaction passcode to customer 15 through communication line 24. The customer can then use any mobile device 20 and can connect mobile payment communication to server 17 through communication line 21 using the transaction passcode. Merchant PC 12 can send billing information with the transaction passcode to server 17 by communication line 18. Server 17 then routes a payment request corresponding to that transaction passcode to mobile device 20.

In yet another method, server 17 can generate a unique transaction passcode as the purchase ID and forwards that passcode to customer's mobile device 20. For example, the passcode can be 5 alphanumerical digits. The customer's mobile device can connect to server 17 with the transaction passcode. Customer 15 communicates the transaction code to merchant 14 through a clerk, and merchant PC 12 can send bill information with that transaction code to server 17. Server 17 then routes a payment request associated with that transaction passcode to the mobile device 20, corresponding to that transaction passcode.

Figure 2:
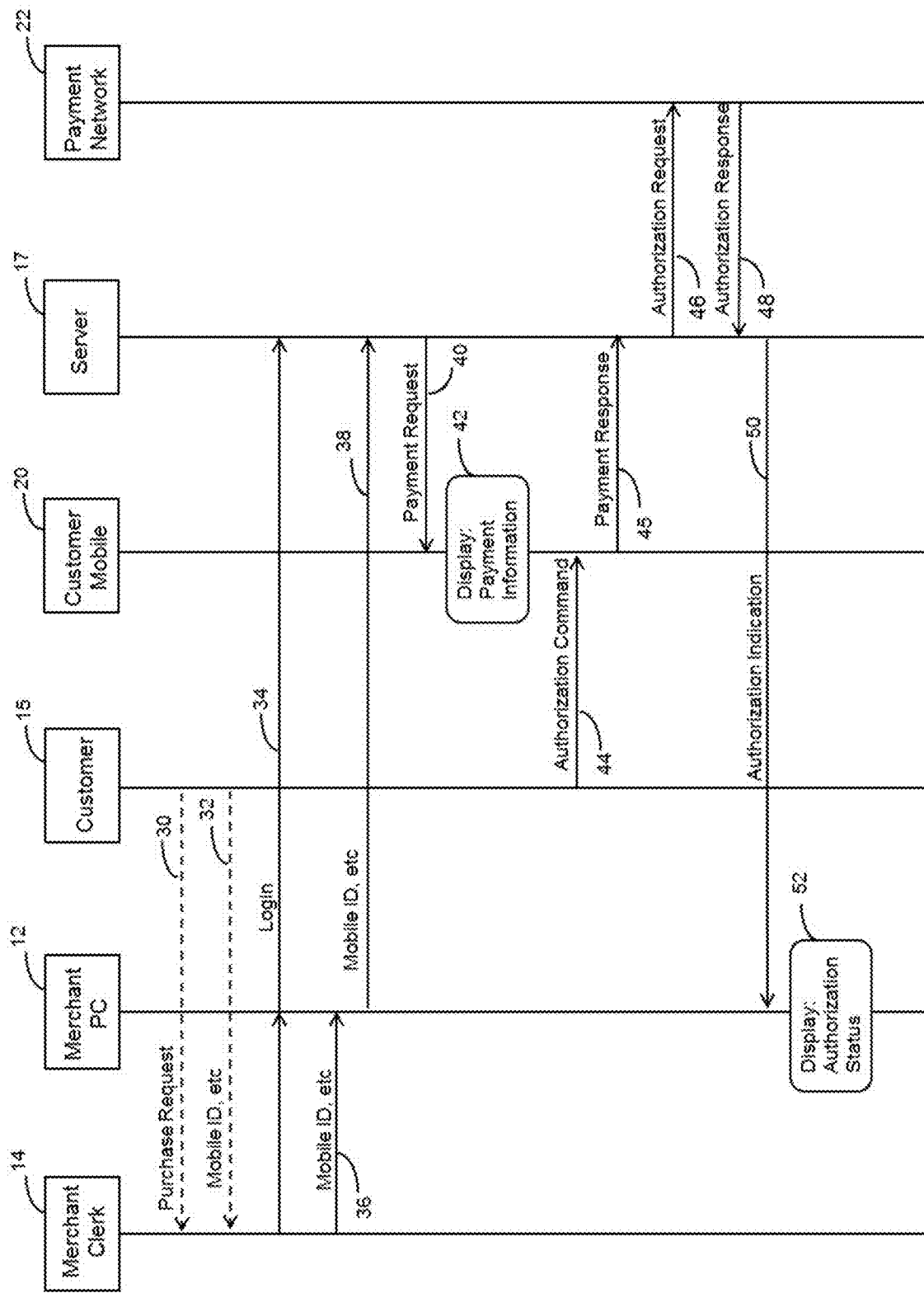
FIG. 2 is a schematic of the message exchange between elements of the payment system according to the present invention.

Turning now to FIG. 2, an example of the method steps for a payment using system 10 is illustrated. The process is initiated when customer 15 places a call to merchant 14 using the merchant's phone number and requests to make a purchase. While calling on the telephone is used in this specific embodiment, it will be understood that other means of communication can be employed as discussed previously. In essence, customer 15 makes a purchase request 30 of merchant 14 through a clerk. Customer 15 then provides a mobile identity 32 of mobile device 20 as a purchase ID for verification of purchase. Mobile device 20, as described previously, is capable of making mobile payments. The mobile identity can be a mobile telephone number or customer's account number registered with server 17 or any other method of facilitating communication between mobile device 20 and server 17. In addition, customer 15 can provide billing address, billing name, etc. for additional verification. Merchant 14 through a clerk then establishes communication between merchant PC 12 and server 17 such as by login 34. Merchant 14 may need to perform a login procedure by entering username and password with server 17 to establish communication between merchant PC 12 and server 17, if not already established. Merchant 14, through a clerk, manually enters 36 the Mobile identity, etc. and billing information, e.g. payment amount, etc. on merchant PC 12. Merchant PC 12 then sends 38 the mobile identity, and payment information, e.g. payment amount, currency code, merchant identity, merchant name, transaction time, etc., to server 17. Server 17 receives the payment information and sends 40 a payment request to mobile device 20 associated with the purchase ID, which in this instance is a mobile identity. Server 17 has the mobile identity associated with the payment information, and therefore can communicate with mobile device 20 using the mobile identity. For example, if the mobile identity is the mobile telephone number of mobile device 20, server 17 can send a push notification or short message to mobile device 20. Payment information can include payment amount, currency code, merchant identity, merchant name, transaction time, etc. Mobile device 20 receives payment request 40 and displays 42 payment information to customer 15 to verify and prompt customer 15 to enter PIN, fingerprint or other identification process, such as facial identification, to initiate mobile payment. Customer 15 authorizes 44 the payment and mobile device 20 generates a payment token after PIN, fingerprint or other identification process, such as facial identification, is successfully verified. Mobile device 20 then sends a payment response 45 to server 17. Payment response 45 can include payment token, payment amount, merchant identity, merchant name, transaction time, etc. Server 17 receives payment response 45 and sends an authorization request 46 to payment network 22. Payment network 22 processes the transaction and replies with an authorization response 48 to server 17. Server 17 sends authorization indication 50 to merchant PC 12 to indicate the status, e.g. approval or disapproval. Merchant PC 12 then displays 52 the transaction status to a clerk of merchant 14.

Figure 3:
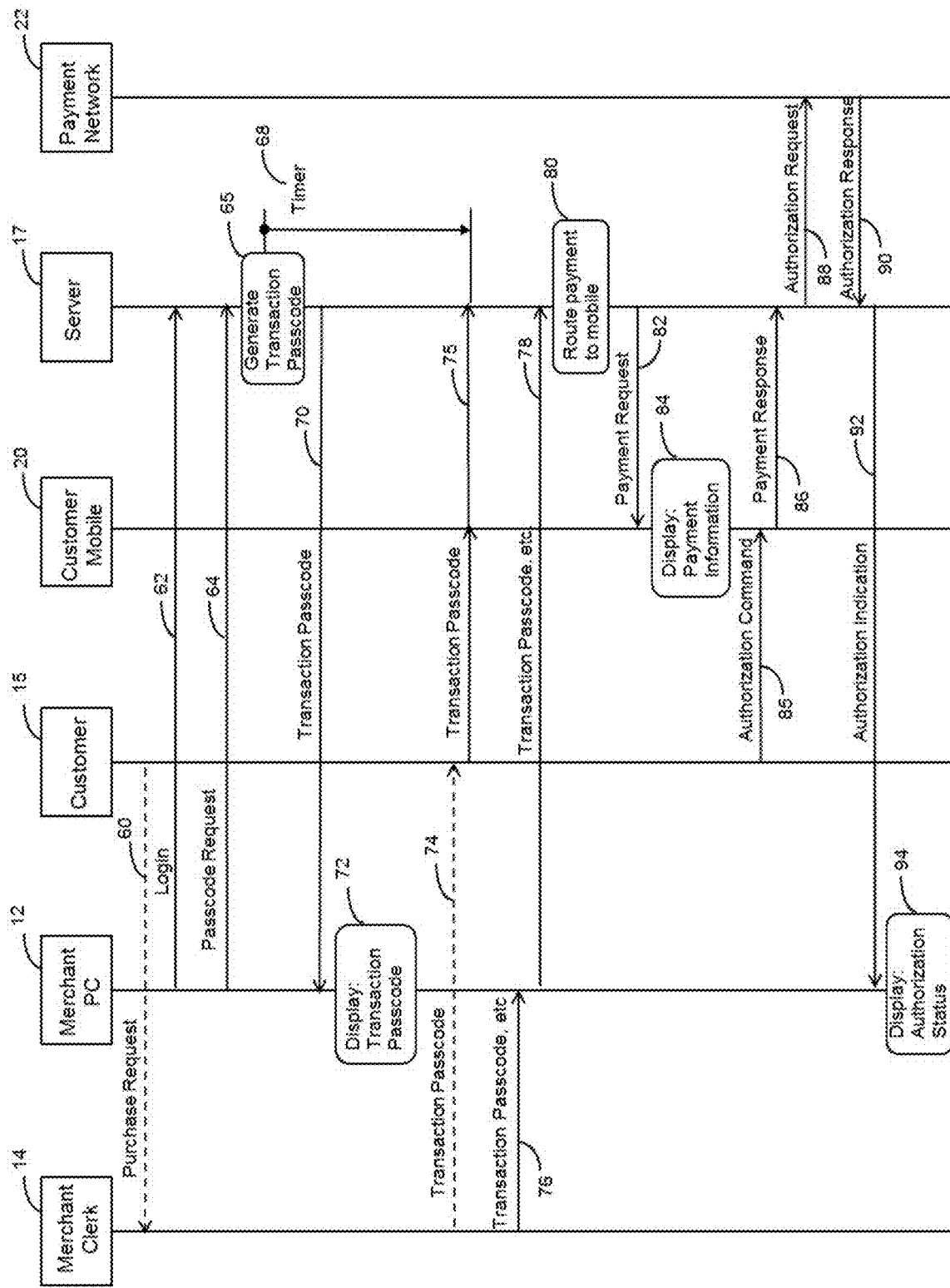
FIG. 3 is a schematic of another message exchange between elements of the payment system.

Referring now to FIG. 3, another example of the method steps for a payment using system 10 is illustrated. While similar to the previous method, in this specific example, the method does not require a mobile identity as purchase ID. Like in the previous example, customer 15 calls to the merchant's phone number, or other communication method as discussed previously, and communicates a purchase request 60. A clerk of merchant 14 may need to perform login procedure 62 by entering username and password with server 17, if not done yet. Merchant PC 12 requests transaction passcode 64 from server 17 to be used as a purchase ID in this embodiment. Server 17 generates 65 a unique transaction passcode for each transaction currently being processed by server 17, thus associating the passcode with a purchase. The transaction passcode is a onetime only use and can be used to differentiate on-going transactions currently being processed by server 17. Server 17 starts a timer 68 to avoid transaction passcode being reused by replay attack. Server 17 sends 70 transaction passcode to merchant PC 12. Merchant PC 12 displays 72 the transaction passcode to merchant 14 viewed by a clerk. Customer 15 launches mobile application in mobile device 20 and receives 74 the transaction passcode from merchant 14, generally by a clerk communicating the passcode through communication line 24 described previously. Customer 15 enters the transaction passcode in the user interface in mobile device 20 and mobile device sends 75 transaction passcode to server 17. Server 17 determines that the transaction passcode was previously generated and clears timer 68 of that transaction passcode. Merchant 14 enters 76 the transaction passcode and bill information, e.g. payment amount, etc., on merchant PC 12. Merchant PC 12 sends 78 the transaction passcode and payment information, e.g. payment amount, currency code, merchant identity, merchant name, transaction time, etc., to server 17. Server 17 receives the transaction passcode and payment information. Server 17 determines the routing 80 of a payment request by matching the transaction passcode received from merchant PC 12 and the transaction passcode received from mobile device 20. Once the correct mobile device is determined, server 17 sends 82 a payment request to mobile device 20 having a matching transaction passcode. Mobile device 20 receives the payment request and displays 84 payment information to customer 15 to verify and prompt customer 15 to enter PIN, fingerprint or use other identification protocol, such as facial identification. Customer 15 authorizes 85 the payment and mobile device 20 generates a payment token after identity successfully verified. Mobile device 20 sends 86 payment response to server 17. The payment response can include payment token, payment amount, merchant identity, transaction time, transaction identity, etc. Server 17 receives the payment response and sends 88 the authorization request to payment network 22. Payment network 22 processes the transaction and replies 90 with an authorization response to server 17. Server 17 sends 92 an authorization indication to merchant PC 12 to indicate the status, e.g. approval and completion of purchase. Merchant PC 12 displays 94 the transaction status to merchant 14.

Figure 4:
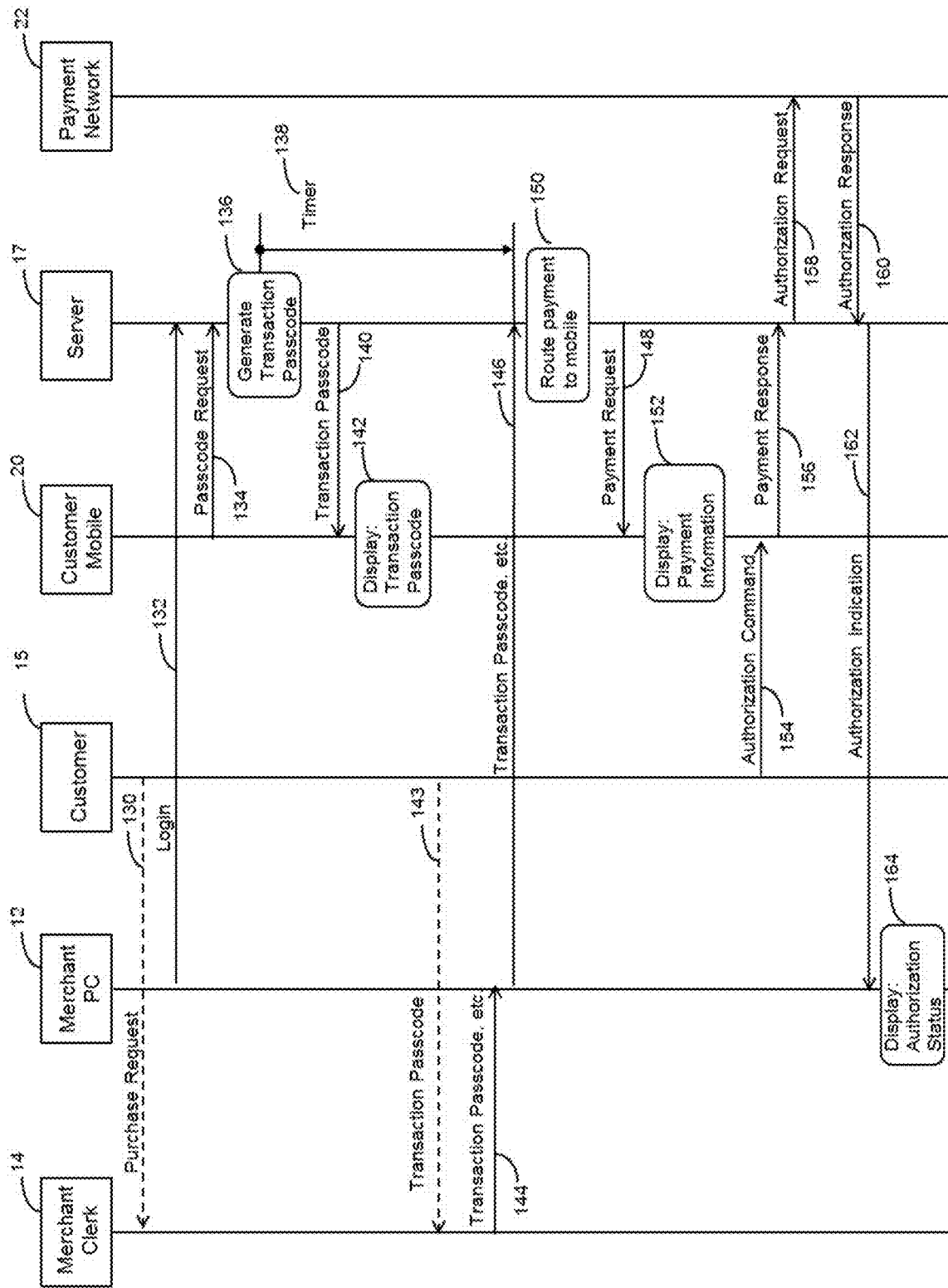
FIG. 4 is a schematic of yet another message exchange between elements of the payment system.

Referring now to FIG. 4, another example of the method steps for a payment using system 10 is illustrated. Like in the previous example, customer 15 calls to the merchant's phone number, or other communication method as discussed previously, and communicates a purchase request 130. A clerk of merchant 14 may need to perform login procedure 132 by entering username and password with server 17, if not done yet. Customer 15 launches a mobile application on mobile device 20 and mobile device 20 requests 134 a transaction passcode from server 17. The transaction passcode serves as the purchase ID in this instance, being associated with a purchase. Server 17 generates 136 a unique transaction passcode for each on-going transaction currently being processed by server 17. The transaction passcode is a one time use only and can be used to differentiate on-going transactions for purchases currently being processed by server 17. Server 17 starts a timer 138 to avoid a transaction passcode being reused by replay attack. Time 138 can be started upon generating 134 a passcode or upon sending 140 the passcode. Server 17 sends 140 a transaction passcode to mobile device 20. Mobile device 20 displays 142 the transaction passcode to customer 15. Customer 15 communicates 143 the transaction passcode to Merchant 14, communicating with a clerk using communication line 24. Merchant 14 enters 144 the transaction passcode and bill information, e.g. payment amount, etc., on merchant PC 12. Merchant PC 12 sends 146 the transaction passcode and payment information, e.g. payment amount, currency code, merchant identity, merchant name, transaction time, etc., to server 17. Server 17 determines that the transaction passcode was previously generated and clears timer 138 of that transaction passcode. Server 17 also sends 148 a payment request to mobile device 20. Server 17 routes 150 the payment request to mobile device 20 by matching the transaction passcode from merchant PC 12 and that generated by the server and passed to mobile device 20. Once the mobile device 20 is associated to the transaction by matching the transaction passcode, the remaining steps are the same as described immediately previously.

As will be understood, mobile device 20 may need to download a mobile application and register account name, billing address, mobile telephone number, etc. with server 17 to proceed with the previously described transactions using system 10 of the present invention. Some mobile applications may be system applications that do not need to be downloaded and come with mobile device 20.

The previously described methods do not discuss error cases and some additional handling can be added. For example, in FIG. 2, if mobile identity is not found in the registration database or additional verification information does not match with that of the mobile identity, server 17 can reply with a reject message to merchant PC 12 and merchant PC will display the message to merchant 14. Merchant 14 can then request customer 15 to confirm with the correct mobile identity and other verification information for a retry.

As another example, in the method illustrated in FIG. 3, if the transaction passcode in sent step 78 does not match, server 17 will reply with a reject message and merchant PC 12 will display to merchant 14. Merchant PC 12 can request another transaction passcode from server 17 to restart the process in another attempt.

In yet another example for FIG. 4, if the transaction passcode does not match, server 17 will reply with a reject message and merchant PC 12 will display to merchant 14. Merchant 14 can tell customer 15 to retry another request and customer 15 can communicate the new transaction passcode to merchant 14.

Additionally, if the timer in the various methods expires, server 17 can send a new transaction passcode to merchant PC 12 requesting retry in the method illustrated in FIG. 3. If the timer started at passcode generation 134 of the method illustrated in FIG. 4 expires, server 17 can send a new transaction passcode to mobile device 20 requesting retry. Mobile device 20 displays the new transaction passcode to customer 15 and customer 15 can tell merchant 14 the new passcode to retry the process.

While mobile device 20 may need to install a mobile app to perform the processing described above, a mobile web browser can be used to support the download of a program script (e.g. Java script) and launch the program script to interact with a mobile wallet without a mobile app, as illustrated with reference to FIG. 5.

Figure 5:
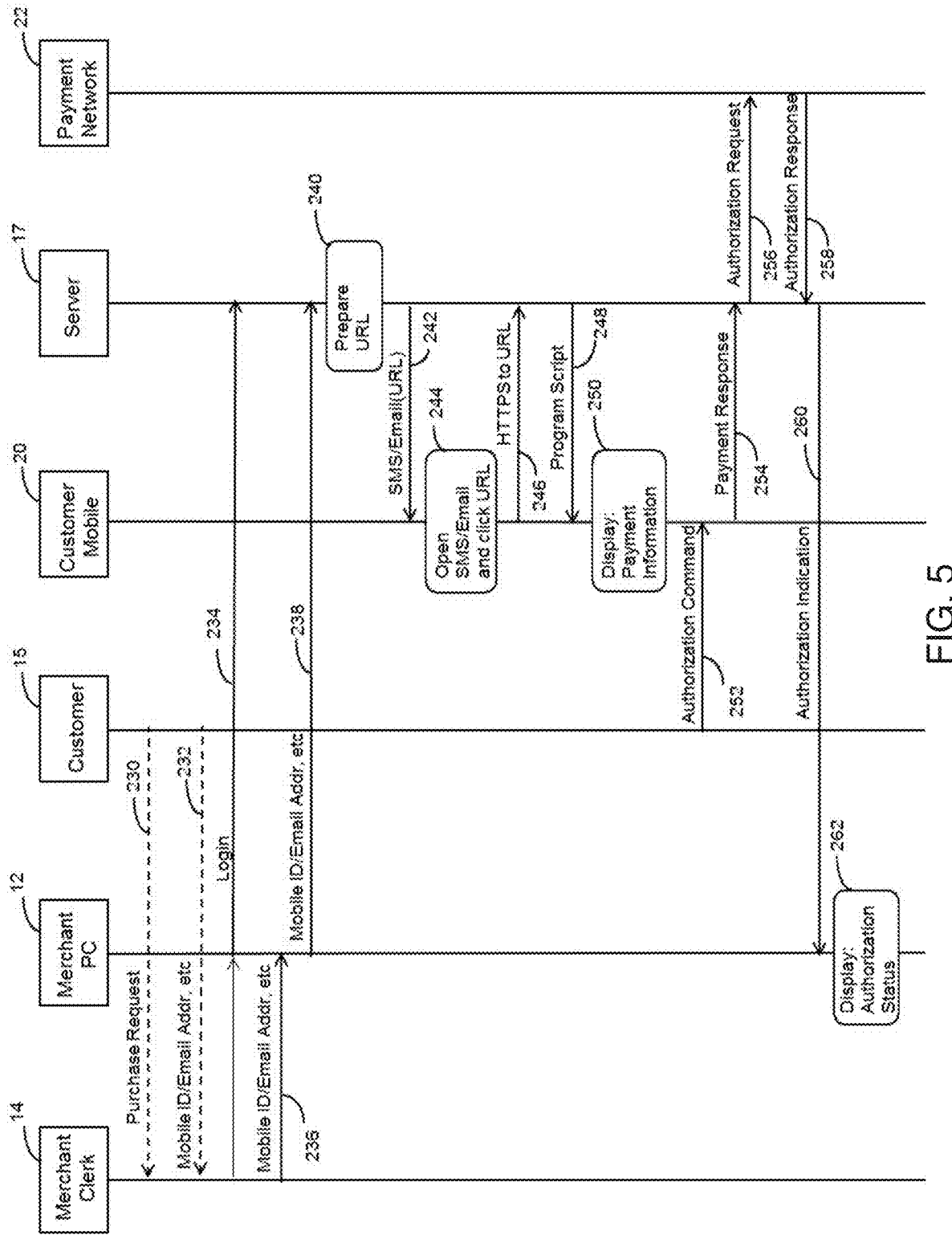
FIG. 5 is a schematic of a further message exchange between elements of the payment system.

Turning now to FIG. 5, an example of the method steps for a payment using system 10 is illustrated. The process is initiated when customer 15 places a call to merchant 14 using the merchant's phone number and requests to make a purchase. While calling on the telephone is used in this specific embodiment, it will be understood that other means of communication can be employed as discussed previously. In essence, customer 15 makes a purchase request 230 of merchant 14 through a clerk. At this time, customer 15 also provides 232 a mobile identity of mobile device 20 or email address to merchant 14. The mobile identity can be a mobile telephone number or customer's account number registered with server 17 associated with mobile telephone number. In addition, the customer can provide billing address, billing name, etc. for additional verification. Merchant 14 through a clerk then established communication between merchant PC 12 and server 17 such as by login 234. Merchant 14 may need to perform a login procedure by entering username and password with server 17 to establish communication between merchant PC 12 and server 17, if not already established. Merchant 14, through a clerk, enters 236 the Mobile identity/Email address, etc. and billing information, e.g. payment amount, etc. on merchant PC 12. Merchant PC 12 then sends 238 mobile identity/Email Address, and payment information, e.g. payment amount, currency code, merchant identity, supported networks, merchant name, transaction time, etc. to server 17. Server 17 prepares 240 a URL (Uniform Resource Locator) link that can include transaction information, e.g. transaction identity (TID), transaction time, payment information (e.g. transaction amount, currency code, merchant identity, supported networks, etc.) and message authentication code to protect the integrity of the transaction information. Server 17 sends 242 the URL (Uniform Resource Locator) in SMS (or MMS) to the mobile number or in email to the email address as previously received from merchant PC 12. Customer 15 receives SMS (or MMS) on mobile device 20 and will select 244 the URL link. Alternatively, customer 15 can receive an email and open the email on mobile device 20, then select the URL link. Mobile device 20 sets up 246 a HTTPS session with server 17 by using the URL link which can include transaction information. Server 17 may need to request a validation token from the mobile payment provider (e.g. Apple) to allow the mobile browser to interact with the mobile payment core to generate the encrypted payment data for each payment transaction. Server 17 downloads 248 a program script and validation token to mobile device 20. With transaction information embedded in the URL, the program script can retrieve the payment related information. Mobile device 20 displays 250 some payment information, e.g. transaction amount, merchant name (which can be derived from merchant identity; otherwise merchant name can be sent as part of URL) and etc., and prompt the customer to authorize. Mobile device 20 receives payment request and displays payment information 250. The customer is required to authorize 252 the payment using biometric input, e.g. fingerprint, facial identification, or passcode. The program script interacts with the mobile payment core of the mobile device to generate the encrypted payment data. The encrypted payment data can include payment token (i.e. substituted credit or debit card number), transaction amount, currency code, cryptogram of card transaction verification, etc. Mobile device 20 sends payment response 254 to server 17. The payment response may include payment token, payment amount, merchant identity, merchant name, transaction time, transaction identity, etc. Server 17 receives payment response 254 and sends an authorization request 256 to payment network 22. Payment network 22 processes the transaction and replies with an authorization response 258 to server 17. Server 17 sends authorization indication 260 to merchant PC 12 to indicate the status, e.g. approval or disapproval. Merchant PC 12 then displays 262 the transaction status to a clerk of merchant 14.

In specific examples, the URL can include the URL address of server 17 and transaction information. For example, www.xyz.com/pay.html?tid1=123456&tim=2017: 09:18:15:57&amt=49.99&cur=02&mid=xyz.com.wallet& cap=07&mac=zndsepfae930and040ck83nokd0ns823

The information after "?" is the transaction information, whose parameters are separated by "&". The parameter value starts with "parametername=". For example, the parameter names can include the following:

tid1: part of transaction identity tim; transaction time yyyy:mm:dd:hh:mm. For example, tim appended with tid1 becomes a transaction identity, i.e. yyyy:mm:dd:hh:mm/nnnnnn amt: transaction amount cur: currency code mid: merchant identity, e.g. xyz.com.wallet (e.g. wallet can be a mobile wallet provider name)

cap: supported brand network, Bit 0: 'American Express'; Bit 1: 'Master Card'; Bit 2: 'Visa' mac: Message authentication code, i.e. security hash of the URL content. This is to verify that the URL was truly generated by the Server and that the integrity of the URL content. In case of failure in verification, the merchant can decline the remaining procedures.

Depending on the mobile payment API requirement, other parameter names and values can be added or change in the URL.

Note that the URL may be too long to fit into one SMS text, segmentation of the URL into multiple SMS texts may be needed; however, that would increase the probability of missing the URL (due to missing any one segmented SMS text) or increase the texting cost (due to multiple SMS texts); hence, an alternative method described below can be used:

i. A small SMS trigger text with transaction Id (and other subset of transaction information, e.g. transaction amount, merchant identity and/or message authentication code, may be included) can be sent first to the mobile device.

ii. Once user clicks on the SMS trigger text, which launches a HTTPS connection to online merchant. Online merchant launches a program script, which initiates a HTTPS session to processing server to request detail payment transaction information.

Alternative messaging methods can be used to send URL link with embedded transaction identity, e.g. WhatsApp, Skype, LINE, WeChat, Facebook messaging, etc.

Figure 6:
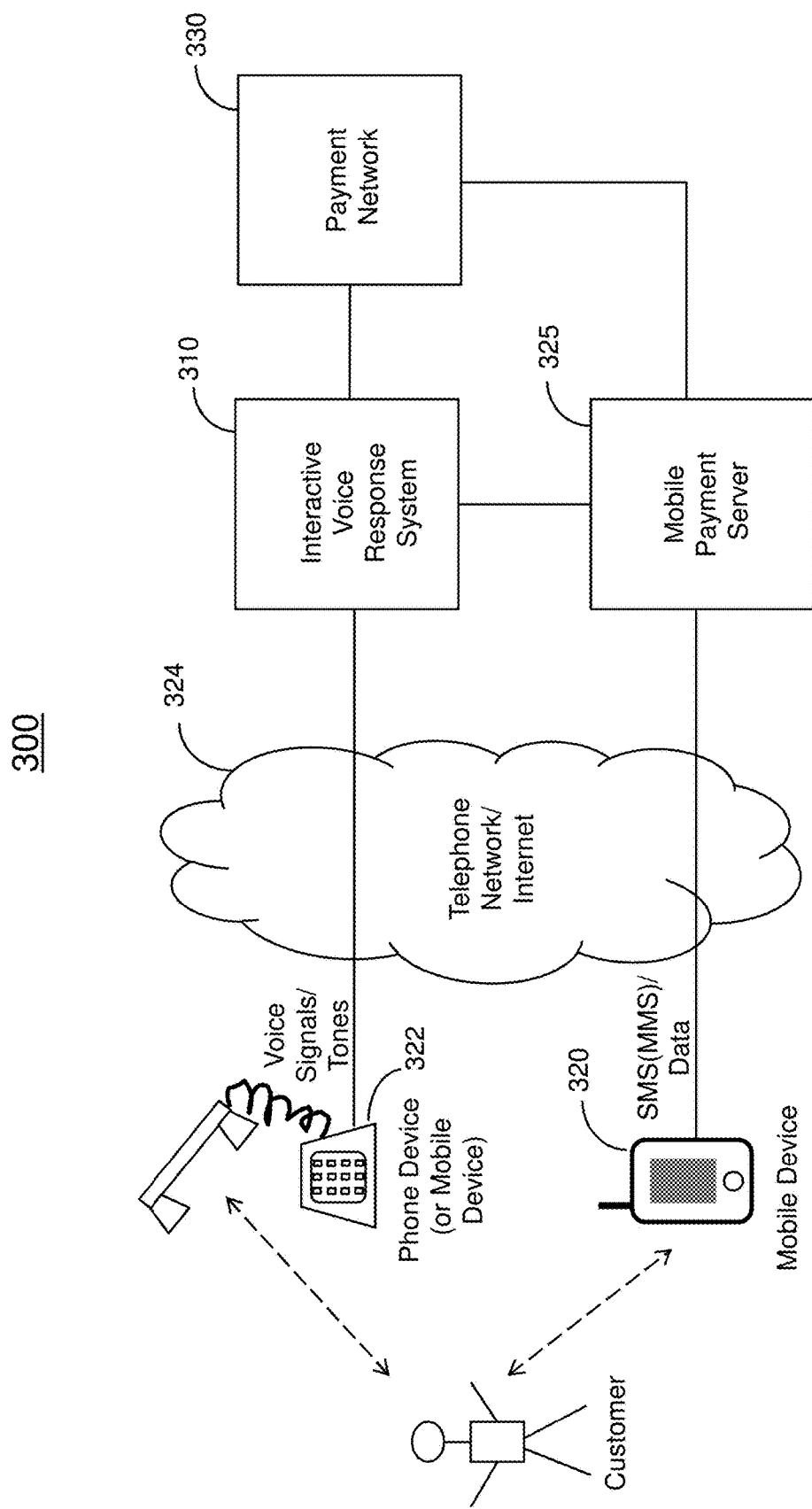
FIG. 6 is simplified block diagram of a payment system, using an interactive voice response system as an automated response system, according to the present invention.

Turning now to FIG. 6, a mobile payment system generally designated 300 is illustrated. Mobile payment system 300 is similar to mobile payment system 10 as described above, but with the replacement of merchant clerk 14 with an automated response system. In this preferred embodiment, the automated response system is a voice response (IVR) system 310 associated with a merchant from which products and/or services can be purchased. Mobile payment system 300 includes IVR system 310 couplable in communication with a mobile device 320 and customer phone device 322 through a network 324 such as a cellular phone system, the internet and the like. Customer mobile device 320 is used by a customer to provide mobile payment for credit card or debit card payment. Mobile device 320 can be a smart phone, a tablet, or a wearable device capable of mobile payment, such as and not limited to, Apple Pay, Google Pay, Samsung Pay, EMV (Europay, Mastercard, and Visa) Tokenization SIM, etc. Mobile device 320 can interface with the customer using voice, keypad, LCD display, fingerprint sensor, camera, and the like. Customer phone device 322 can be a separate device from mobile device 320 or customer phone device 322 can be the same as mobile device 320. Phone device 322 can be a normal landline phone, smart phone or even virtual assistant devices, e.g. Amazon Echo, Google Nest mini, Apple HomePod mini, etc. If customer phone device 322 is the same device as mobile device 320, it of course must be one of the types of devices listed as possible mobile devices and must have mobile payment capability, In the virtual assistant devices, the customer can speak to ask the device to make an IMS (Internet Multimedia Subsystem) phone call connecting to the merchant's IVR system 310.

A mobile payment server 325 is used to process payment transactions. Mobile payment server 325 can be a separate device from IVR system 310 of the merchant and operated by a 3rd party service provider. Alternatively, mobile payment server can be a part of the merchant and operated by the merchant. Mobile payment server 325 interfaces with IVR system 310 to initiate a payment transaction with mobile device 320 to pay for goods or services. Mobile payment server 325 connects to a payment network 330. Mobile payment server 325 can connect to mobile device 320 through network 324 such as a telephone network (e.g., SMS/MMS messaging) or internet (e.g., data communication). Payment network 330 needs additional functionality to process a token based credit or debit card transaction. It can augment with a Token Service Provider (TSP) which provides retrieval of a real card number from the payment token. For example, TSP can belong to the issuer, brand network, or even mobile wallet service provider. Payment network 330 processes payment transactions in a conventional manner and therefore will not be described in detail.

Figure 7:
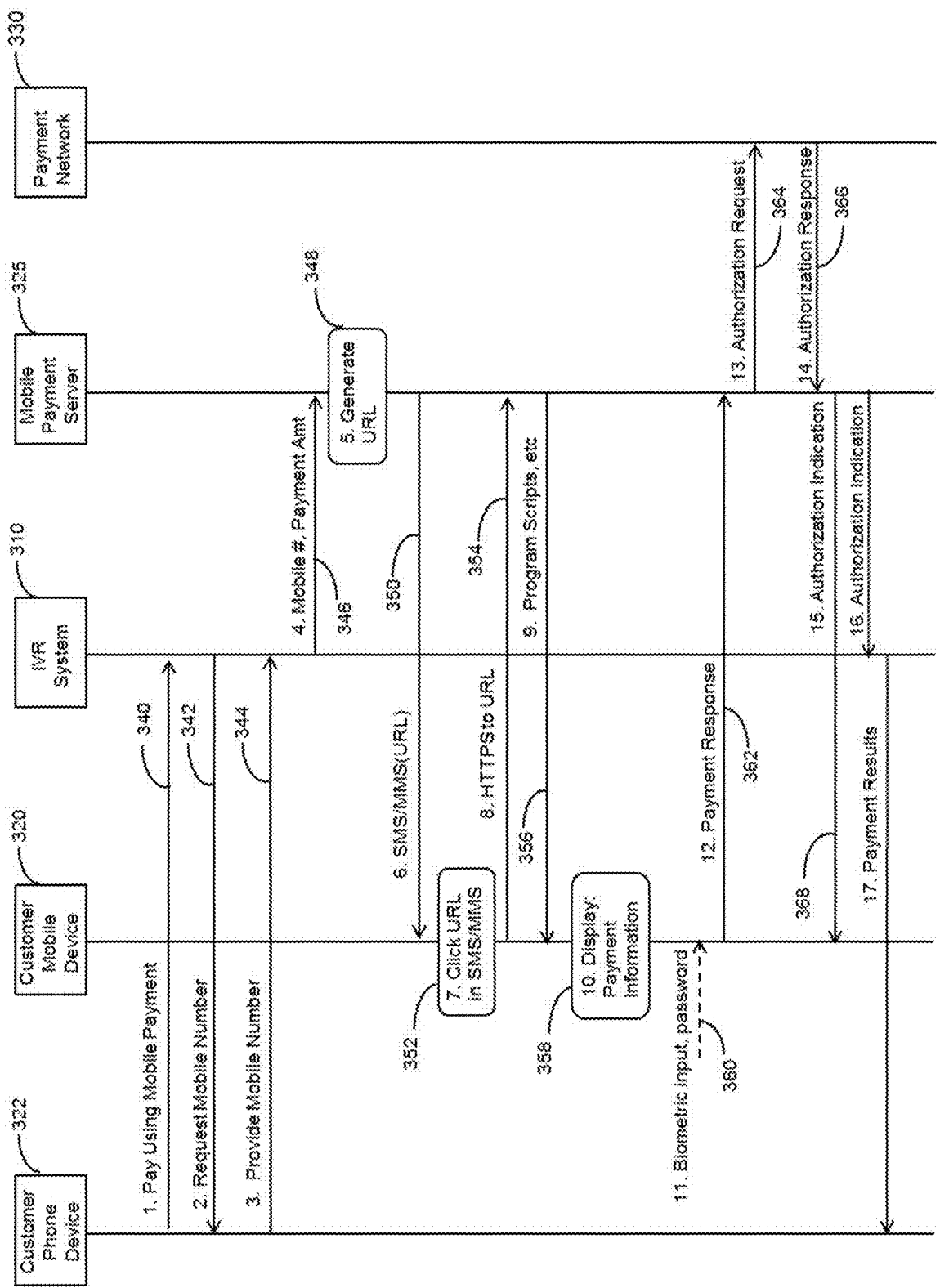
FIG. 7 is a schematic of the message exchange between elements of the payment system of FIG. 6, according to the present invention.

Referring to FIG. 7, an example of a method utilizing IVR system 310 with a mobile payment, according to the present invention, is illustrated. The procedure begins with a preamble, not specifically shown but described in previous embodiments. The preamble includes a customer calling the merchant using phone device 322 and connecting to IVR system 310. In mobile payment system 10, as described previously, the process is initiated when customer 15 places a call to merchant 14 using the merchant's phone number and requests to make a purchase. The "preamble" is customer 15 making a purchase request 30 of merchant 14 through a clerk. Customer 15 then provides a mobile identity 32 of mobile device 20 as a purchase ID for verification of purchase. In the present embodiment, mobile payment system 300 replaces merchant clerk 14 of mobile payment system 10 with IVR system 310. IVR system 310 receives an account number, bill transaction number, product number or product name of purchase (for example the shipping address is in the account number) in voice signals or telephone keypad tones from customer's phone device 322. With the account number or bill transaction number or product number or product name, IVR system 310 can retrieve the payment amount due from the customer billing database of the merchant. Thus, the customer "talks" to IVR system 310 instead of merchant clerk 14. From this point, a mobile payment is made with steps illustrated in FIG. 7.

In step 1, the customer, using phone device 322 in communication with IVR system 310, selects 340 to make a mobile payment. IVR system 310 receives voice signals or telephone keypad tones from phone device 322 that the customer selects 340 to use the mobile payment method to pay for the payment due in response to voice signals sent by IVR system 310 and received by customer phone device 322, e.g. "Would you like to pay now using mobile payment abc?" For example, "abc" can refer to the mobile payment method in this invention or mobile wallet name(s).

In step 2, IVR system 310 sends voice signals 342 to customer's phone device 322 requesting the mobile number for customer mobile device 320 capable of the mobile payment, e.g. "Please tell me your mobile number of mobile payment or enter in the telephone keypad."

In step 3, IVR system 310 receives voice signals or telephone keypad tones 344 from customer phone device 322 giving the mobile number of customer mobile device 320 capable of the mobile payment.

In step 4, IVR system 310 sends 346 the mobile number received in step 3 and payment amount to mobile payment server 325 as payment information. Other information can be included in payment information, e.g. merchant name, summary of bill or purchase information.

In step 5, mobile payment server 325 creates 348 a URL (Uniform Resource Locator) link that identifies mobile payment server 325. The URL link also includes transaction information embedded therein, which can include, for example, transaction identity (TID), and/or payment information (e.g. transaction amount, currency code, merchant identity, merchant supported brand networks, etc.) and message authentication code, e.g. a signature using crypto hash, to protect the integrity of the transaction information. One alternative is that the URL link includes only transaction identity and message authentication code and payment information can be retrieved in step 9, as will be described presently, by using transaction identity (in the URL) which can be associated with detailed payment information.

In step 6, mobile payment server 325 sends 350 the URL link in SMS (Short Message Service) or MMS (Multimedia Messaging Service) to customer mobile device 320 using the mobile number received in step 4.

In step 7, customer mobile device 320 receives 352 the SMS/MMS and the customer actively selects the URL link to trigger a HTTPS connection setup with mobile payment server 325.

In step 8, mobile payment server 325 receives 354 a HTTPS setup request from customer mobile device 320 which also includes the transaction information in the URL link.

In step 9, mobile payment server 325 request 356 a validation token from the mobile payment provider to allow to access a mobile payment core of customer mobile device 320 to generate the encrypted payment data for each payment transaction. Mobile payment server 325 downloads program scripts, e.g. Java scripts, and validation token (and detailed payment information linked to the transaction identity especially when URL only includes transaction identity) to customer mobile device 320. The program scripts downloaded at the time of payment eliminate the need for pre-installation of a mobile application. This saves the customers time and effort needed to download and register a mobile application, especially for infrequent payments. More detailed payment information can also be sent in step 9, e.g. merchant name, summary of bill or purchase information.

In step 10, with transaction information embedded in the URL, the program scripts running in customer mobile device 320 can retrieve the payment information. Customer mobile device 320 displays 358 some detailed payment information, e.g. transaction amount, merchant name, etc., and prompts the customer to authorize the payment.

In step 11, customer mobile device 320 receives the customer authorization 360 for the payment using a password, PIN number, biometric input, e.g. fingerprint, facial recognition, or other security methods. The downloaded program scripts can detect the corresponding mobile wallet provider and use the corresponding API of the mobile wallet to request the mobile payment core of customer mobile device 320 to return the encrypted payment data. For example, the program script downloaded from the URL link can detect the presence of each mobile wallet and call the associated API. The encrypted payment data can include payment token (i.e. substituted or virtual credit or debit card number, or device PAN, namely Primary Account Number), payment amount, currency code, merchant identity, cryptogram of card verification, etc. The API may require input of payment information, e.g. payment amount, currency code, merchant identity, etc. This is the reasons this payment information needs to download to customer mobile device 320 in step 6 or step 9.

In step 12, customer mobile device 320 sends payment response 362 to mobile payment server 325. The payment response includes encrypted payment data which includes payment token, payment amount, currency code, merchant identity, cryptogram of card verification, etc.

In step 13, mobile payment server 325 receives the payment response and sends an authorization request 364 to payment network 330.

In step 14, payment network 330 processes the transaction and replies 366 with an authorization response to mobile payment server 325.

In step 15, mobile payment server 325 sends 368 an authorization indication to customer mobile device 320 to indicate the results, e.g. approval or rejection.

In step 16, mobile payment server 325 sends 370 the authorization indication to IVR system 310.

In step 17, IVR system 310 sends voice signals to customer phone device 322 to indicate the payment results, e.g. "The card payment is approved. Thank you for your payment."

In step 6 of FIG. 7, URL in SMS/MMS can be, for example: https://xyz.com/pay.html?tid=12345689012&amt=49.99&cur=02&mid=xyz.com.wallet&cap=07&sig=1ab3e5fae930a6d040cf8356cd044823

The transaction information has parameters separated by "&". The parameter value starts with "parametername=". Mobile payment server 325 has HTTP URL address of www.xyz.com.

For example, the parameter names can include the following:
tid: part of transaction identity
amt: transaction amount
cur: currency code
mid: merchant identity, e.g. xyz.com.wallet (e.g. wallet can be a wallet provider name)

cap: merchant capability of supported brand networks, Bit 0: 'American Express'; Bit 1: 'Master Card'; Bit 2: 'Visa' sig: signature using crypto hash on the URL content. The signature is to verify that the URL was truly generated by mobile payment server 325 and that the content of the URL has not been tampered with. The data can be presented in hexadecimal as one example.

Mobile payment server 325 can reduce length of text strings of URL by sending only subset of the parameters of transaction information, e.g. transaction specific parameters, with remaining merchant specific parameters be known from mobile payment server 325, e.g., currency code, merchant identity, and cap. For example, URL in SMS/MMS can be: https://xyz.com/pay.html?tid=12345689012&amt=49.99&sig=1ab3e5fae930a6d040cf8356cd044823

Moreover, mobile payment server 325 can only send transaction identity in URL, for example, https://xyz.com/pay.html?tid=12345689012.

Therefore, remaining payment parameter values, such as currency code, merchant identity, cap, etc., can be stored and retrieved (if the mobile payment server is operated by a 3rd party service provider which serves multiple merchants, mobile identity will need to be sent to mobile payment server in step 4 of FIG. 7 to retrieve), and sent to customer mobile device 320 when program scripts are downloaded by mobile payment server 325. That is, detailed payment information required by the API of the mobile wallet used by customer mobile device 320 can be sent in step 9 in FIG. 7. Furthermore, detailed payment information for the customer to authorize can be sent at this time, e.g. merchant name, summary of bill or purchase information, in step 9 in FIG. 7.

Alternatively, in steps 2 & 3, if the customer has registered with the merchant the mobile number for payment associated with account number provided in the preamble, then IVR system 310 can send a voice signal to customer phone device 322 confirming the mobile phone number, e.g. "Will you use registered mobile number 8581234567 to pay?" Then IVR system 310 can receive confirmation from customer phone device 322.

Figure 8:
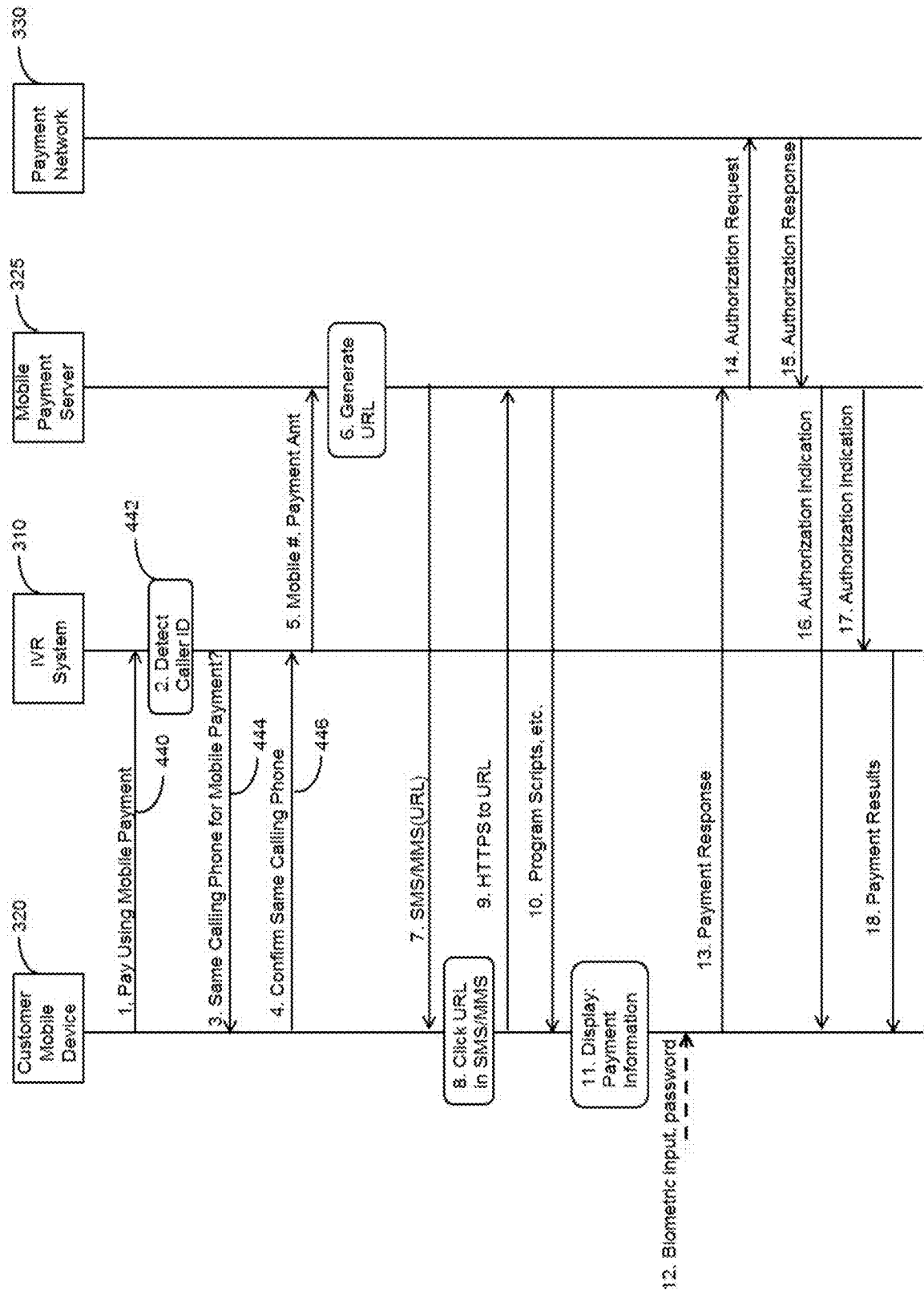
FIG. 8 is schematic of another example of the message exchange between elements of the payment system of FIG. 6, according to the present invention.

Turning now to FIG. 8 another method utilizing IVR system 310 with a mobile payment, according to the present invention, is illustrated. In this embodiment, the method differs from the previous method of FIG. 7 in that the customer employs customer mobile device 320 as both the customer mobile device 320 and customer phone device 322 of FIG. 7. This method also includes a preamble (not shown) wherein the customer calls using customer mobile device 320 to IVR System 310 of the merchant. IVR system 310 receives an account number, bill transaction number or product number of purchase (for example shipping address is in the account number), in voice signals or telephone keypad tones from customer mobile device 320. With the account number or bill transaction number, IVR system 310 can retrieve payment amount due from the customer billing database of the merchant. From this point, a mobile payment is made with steps illustrated in FIG. 8 and described as follows.

In step 1, IVR system 310 receives voice signals or telephone keypad tones from customer mobile device 320 that the customer selects 440 to use the mobile payment method to pay for the payment due in response to voice signals sent by IVR system 310 and received by customer mobile device 320, e.g. "Would you like to pay now using mobile payment abc?" For example, "abc" can refer to the mobile payment method in this invention or mobile wallet name(s).

In step 2, IVR system 310 detects 442 the caller ID of customer mobile device 320.

In step 3, since IVR system 310 detects the caller ID of customer mobile device 320, IVR system can send a query 444 to customer mobile device 320 asking if the same calling phone can be used for mobile payment, e.g. "Is same calling phone for your mobile payment?"

In step 4, IVR system 310 receives 446 voice signals or telephone keypad tones from customer mobile device 320 to confirm that the same phone device is to be used as customer mobile device 320 for mobile payment. (If IVR System receives voice signals or telephone keypad tones from customer phone device 322 to answer no, the process described from step 2 of FIG. 7 can be used, namely to request mobile number of mobile payment).

In step 5, IVR system 310 sends the mobile number from the caller ID in step 2, and the payment amount retrieved to mobile payment server 325.

Steps 6-18 are the same as steps 5-17 in FIG. 7.

After mobile payment successfully completes in FIG. 8, IVR system 310 can archive the mobile number of mobile payment associated with the caller ID in the database to be used in the future to save the customer from providing the mobile number of mobile payment. In following transaction, if the same caller ID is detected, then IVR system 310 can retrieve from its database the mobile number associated with the caller ID and ask the customer to confirm, e.g. "Would you like to use mobile number 8581234567 on the record to pay?" and receive confirmation from the customer before using the archived mobile number. Note that caller Id can be the same or different from mobile device of mobile payment. In case the customer does not agree, IVR system 310 still needs to request the mobile number as in step 2 in FIG. 7.

Alternatively, if the customer registers a mobile number for customer mobile device 320 already, then IVR system 310 can utilize the database to retrieve the registered mobile number for mobile payment. IVR system 310 can ask the customer to confirm, e.g., "Would you like to use mobile number 8581234567 on the record to pay?" and receive confirmation from the customer before using the registered mobile number. In case the customer does not agree, IVR System still needs to request the mobile number as in step 2 in FIG. 7.

Figure 9A:
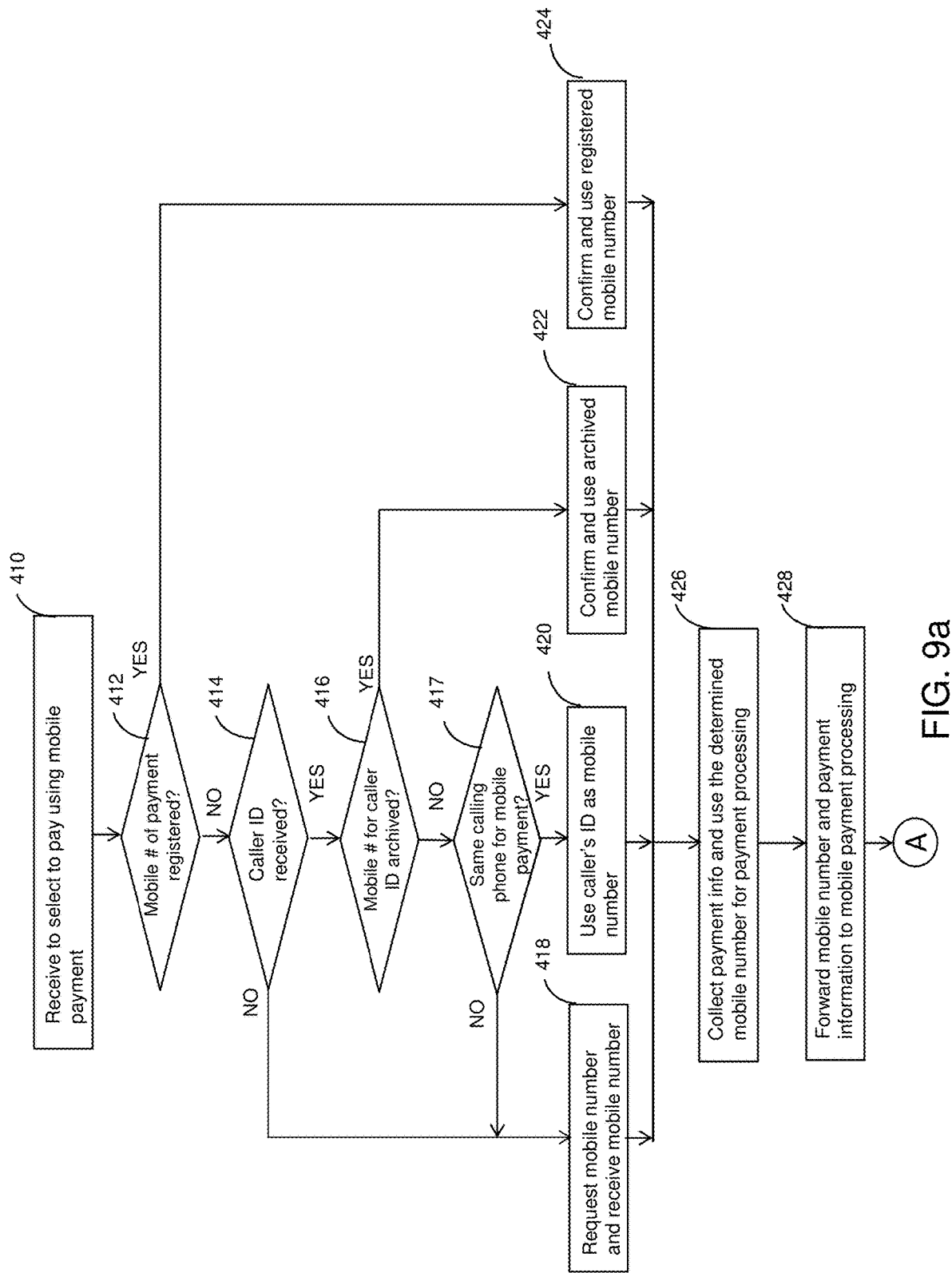
FIG. 9a is a flow chart of the process flow followed by IVR system during the mobile payment.

Referring to now FIG. 9a, a flow chart of the process flow followed by IVR system 310 during the mobile payment procedure is shown.

In block 410, IVR system 310 receives the information that the customer wants to use the mobile payment method of this invention and receives a response from the customer that the customer selects the mobile payment method to pay for the payment due via voice signals or telephone keypad tones as described previously. This corresponds to step 1 in FIGS. 7 and 8.

In block 412, IVR system 310 checks its database to determine if the customer has registered a mobile number of customer mobile device 320 with the account. If yes, the process moves to block 424; otherwise, the process continues to block 414.

In block 414 IVR system 310 checks its database to see if the caller ID of customer phone device 322 is available. If no, the process continues at block 418; otherwise the process continues to block 416.

In block 416 IVR system 310 checks its database to see if there is a mobile number associated with the caller ID already archived in the database. If yes, the process continues to block 422; otherwise the process continues to block 417.

In block 417 IVR system 310 determines if the same calling phone is used for the mobile payment and well as the replies from the customer in voice signals or telephone keypad tones. If yes, the process continues to block 420; otherwise, the process continues to block 418. The process of block 420 corresponds to steps 3 and 4 in FIG. 8. IVR system 310 uses the received caller ID as the mobile number for customer mobile device 320 to be use in making a mobile payment.

In block 418 IVR system 310 requests the mobile number from the customer and receives the mobile number of customer mobile device 320 from the customer in voice signals or telephone keypad tones using customer phone device 322. This corresponds to steps 2 & 3 in FIG. 7. The process continues to block 426.

In block 420 IVR system 310 uses the received caller ID as the mobile number for customer mobile device 320 for mobile payment. The process continues to block 426.

In block 422 IVR system 310 confirms the customer to use mobile number already archived in the database associated with the caller ID for the mobile payment and uses this archived mobile number after the customer confirms. The process continues to block 426. (However, if the customer does not agree, the processing sequence can continue to block 418 to request the mobile number.

In block 424 IVR system 310 confirms the customer to use the mobile number already registered in the database associated with the account for the mobile payment and uses this registered mobile number after the customer confirms. The process continues to block 426. (However, if the customer does not agree, the processing sequence can continue to block 418 to request the mobile number.

In block 426 IVR system 310 retrieves the payment amount due, collects payment info and uses the determined mobile number for payment processing.

In block 428 IVR system 310 sends the mobile number and payment information to mobile payment server 325. This corresponds to step 4 in FIG. 7 or step 5 in FIG. 8.

Figure 9B:
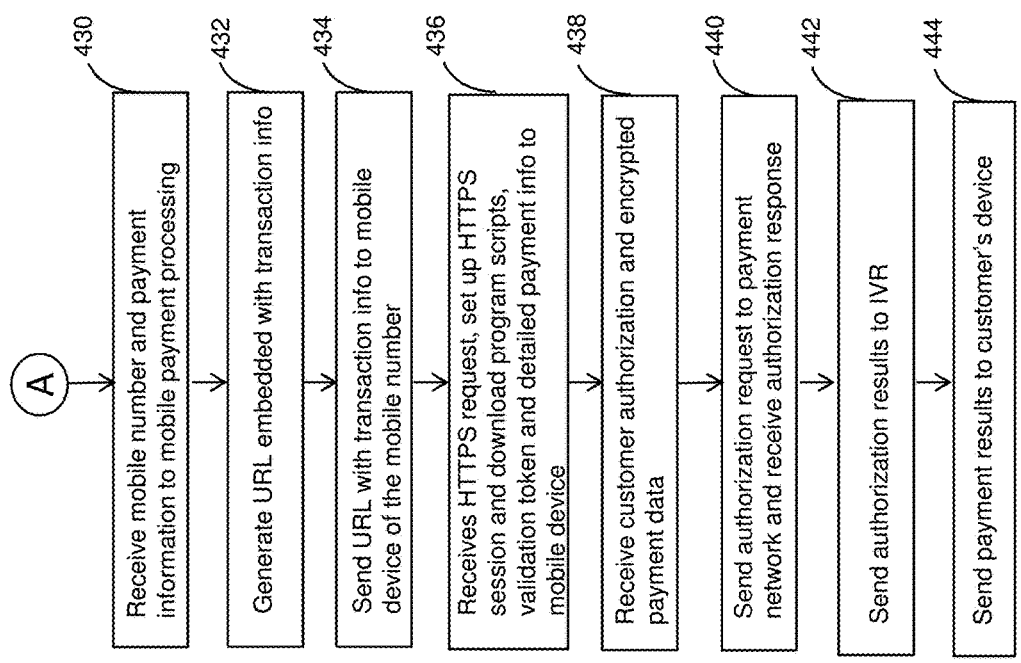
FIG. 9b is a diagram of the process flow followed by mobile payment server during the mobile payment procedure.

Turning now to FIG. 9b, a diagram of the process flow followed by mobile payment server 325 during the mobile payment procedure is shown.

In block 430, mobile payment server 325 receives the mobile number and payment information from IVR system 325. This corresponds to step 4 in FIG. 7 or step 5 in FIG. 8

In block 432, mobile payment server 325 creates an URL embedded with transaction information. This corresponds to step 5 in FIG. 7 or step 6 in FIG. 8.

In block 434, mobile payment server 325 sends the URL with transaction information to customer mobile device 320 using SMS and the mobile number. This corresponds to step 6 in FIG. 7 or step 7 in FIG. 8.

In block 436, mobile payment server 325 receives HTTPS request, sets up HTTPS session and downloads program scripts, validation token and detailed payment info to customer mobile device 320. This corresponds to steps 8 & 9 in FIG. 7 or steps 9 & 10 in FIG. 8.

In block 438, mobile payment server 325 receives customer authorization and encrypted payment data from the mobile wallet of customer mobile device 320. This corresponds to step 12 in FIG. 7 or step 13 in FIG. 8.

In block 440, mobile payment server 325 sends encrypted payment data to request for authorization to payment network 330 and receives an authorization response from payment network 330. This corresponds to steps 13 and 14 in FIG. 7 or steps 14 and 15 in FIG. 8.

In block 442, mobile payment server 325 sends authorization results to IVR system 310. This corresponds to step 16 in FIG. 7 or step 17 in FIG. 8.

In block 444, mobile payment server 325 sends payment results to customer mobile device 320.

Figure 10:
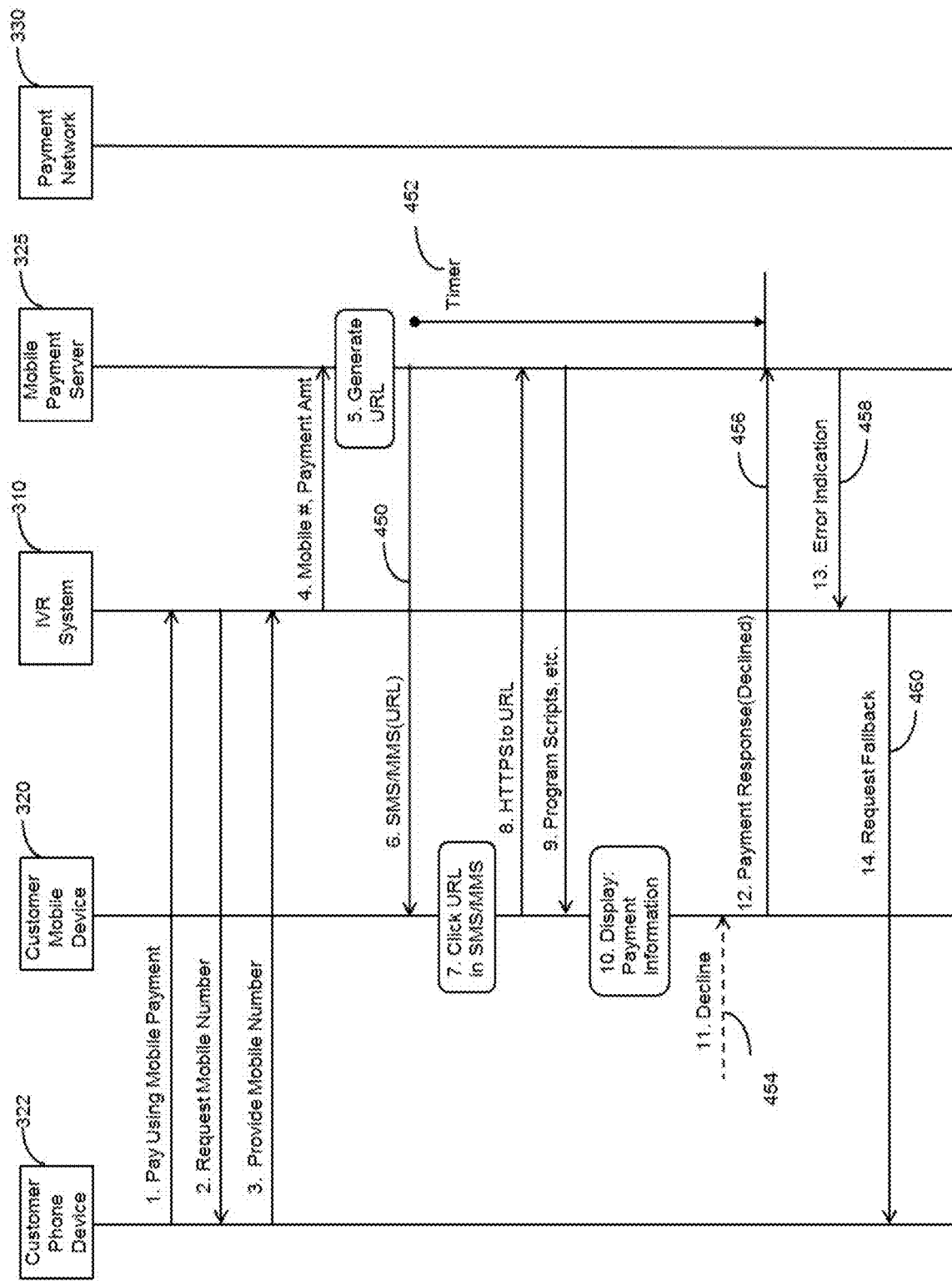
FIG. 10 is a schematic of the message exchange illustrating an example of a procedure including steps for handle error cases.

Referring now to FIG. 10, an example of a procedure including steps for handling error cases is illustrated. The process illustrated in FIG. 10 is identical to that shown in FIG. 7 for steps 1-5.

In step 6, mobile payment server 325 sends 450 the URL (Uniform Resource Locator) in SMS (Short Message Service) and starts a timer creating a timer window 452 to detect error scenario, e.g. no response from customer mobile device 320.

Steps 7-10 are the same as steps 7-10 in FIG. 7.

In step 11, the customer declines 454 the payment request. Customer mobile device 320 receives that the customer selects to decline the payment request, e.g. by clicking the button of declining payment in the user interface shown by customer mobile device 320. Therefore, the downloaded program scripts do not initiate to call API of the mobile wallet and instead, send 456 back "Decline" to mobile payment server 325.

In step 12, customer mobile device 320 sends 456 a payment response to mobile payment server 325. Mobile payment server 325 receives a payment response including "Decline" in the response. Alternatively, timer window 452 expires without receiving any response.

In step 13 mobile payment server 325 encounters "Decline" in payment response or timer expiry and sends 458 error indication to IVR system 310.

In step 14, IVR system 310 can perform fallback procedure 460. For example, IVR system 310 can play voice signals to customer phone device 322 to indicate the payment request declined and request the customer to confirm, re-entering the mobile number, or switch to a legacy payment method (conventional method). IVR system 310 can also transfer the call to a call center agent.

Alternatively, the voice call between IVR system 310 and the customer can also be made using over the top (OTT) application of customer mobile device 320, instead of normal voice calls through the telephone carriers. The OTT applications can be, for example, Skype, WhatsApp, LINE, Facebook, Twitter, etc. However, this may require the party to add another part to a group.

The above systems and methods for mobile payment use voice interactive response systems. Recently, instant chatting, also called chatbot (derived from "chat robot") system, has become a popular method for customers to interact with merchants.

Figure 11:
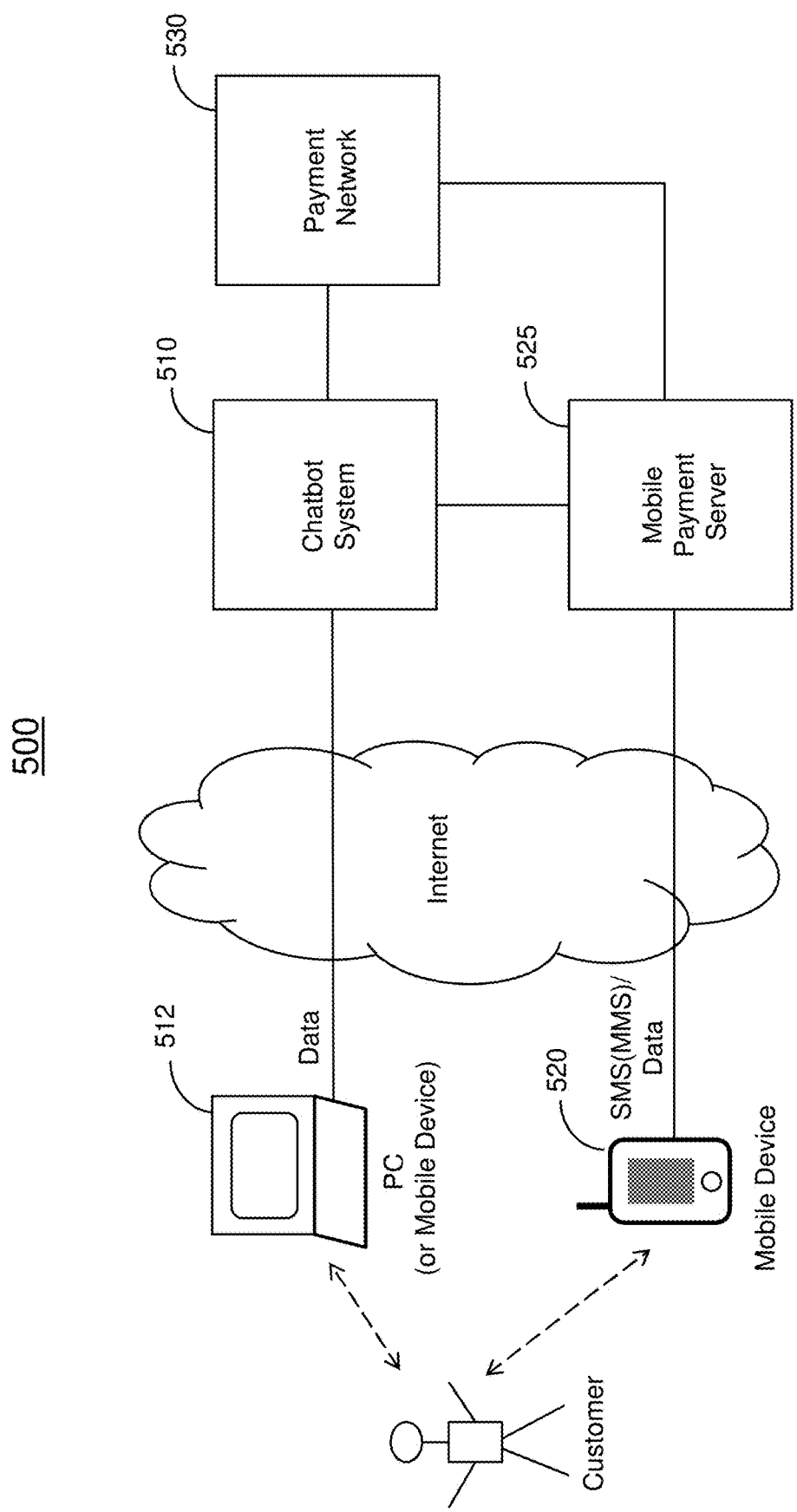
FIG. 11 is simplified block diagram of a payment system, using a chatbot system as an automated response system, according to the present invention.

Turning to FIG. 11, a second system architecture 500, for mobile payment using a chatbot system 510 to replace either a clerk or IVR system 310, is shown. A chatbot is a computer program that simulates human conversation, via chatting communication. It can also switch the chatting session to a real call center agent in case real human interaction is needed. The customer uses a PC 512 to connect to a merchant using Chatbot system 510. PC 512 can be a desktop computer, laptop computer, or tablet, or a mobile device etc. PC 512 can interface with the customer using keypad, mouse, LCD display, and the like. Similarly, a customer mobile device 520 is used by the customer to provide mobile payment for credit card or debit card payment. Customer mobile device 520 can be a smart phone, a tablet, or a wearable device capable of mobile payment, such as and not limited to, Apple Pay, Google Pay, Samsung Pay, EMV (Europay, Mastercard, and Visa) Tokenization SIM, etc. Customer mobile device 520 can interface with the customer using voice, keypad, LCD display, fingerprint sensor, camera, etc. Customer mobile device 520 can be a separate device from PC 512 or PC 512 can actually be the same as customer mobile device 520 which is capable of mobile payment in this novel process and system. Chatbot system 510 connects with customer PC 512 and exchanges instant text messages with customer PC 512. Chatbot system 510 connects to a mobile payment server 525 for mobile payment as in FIGS. 6, 7, 8, and 10. Mobile payment server 525 is used to process payment transaction as in FIG. 6. Mobile payment server 525 can be a separate entity from Chatbot system 510 and operated by a 3rd party service provider. Alternatively, mobile payment server 525 is a part of the merchant and is logically separated from Chatbot system 510. Mobile payment server 525 can interface with Chatbot system 510 in order to process the payment transaction in this process. Mobile payment server 525 connects to a payment network 530. Mobile payment server 525 can connect to customer mobile device 520 in Telephone Network (e.g., SMS/MMS messaging) or Internet (e.g., data communication) as in FIG. 6.

Figure 12:
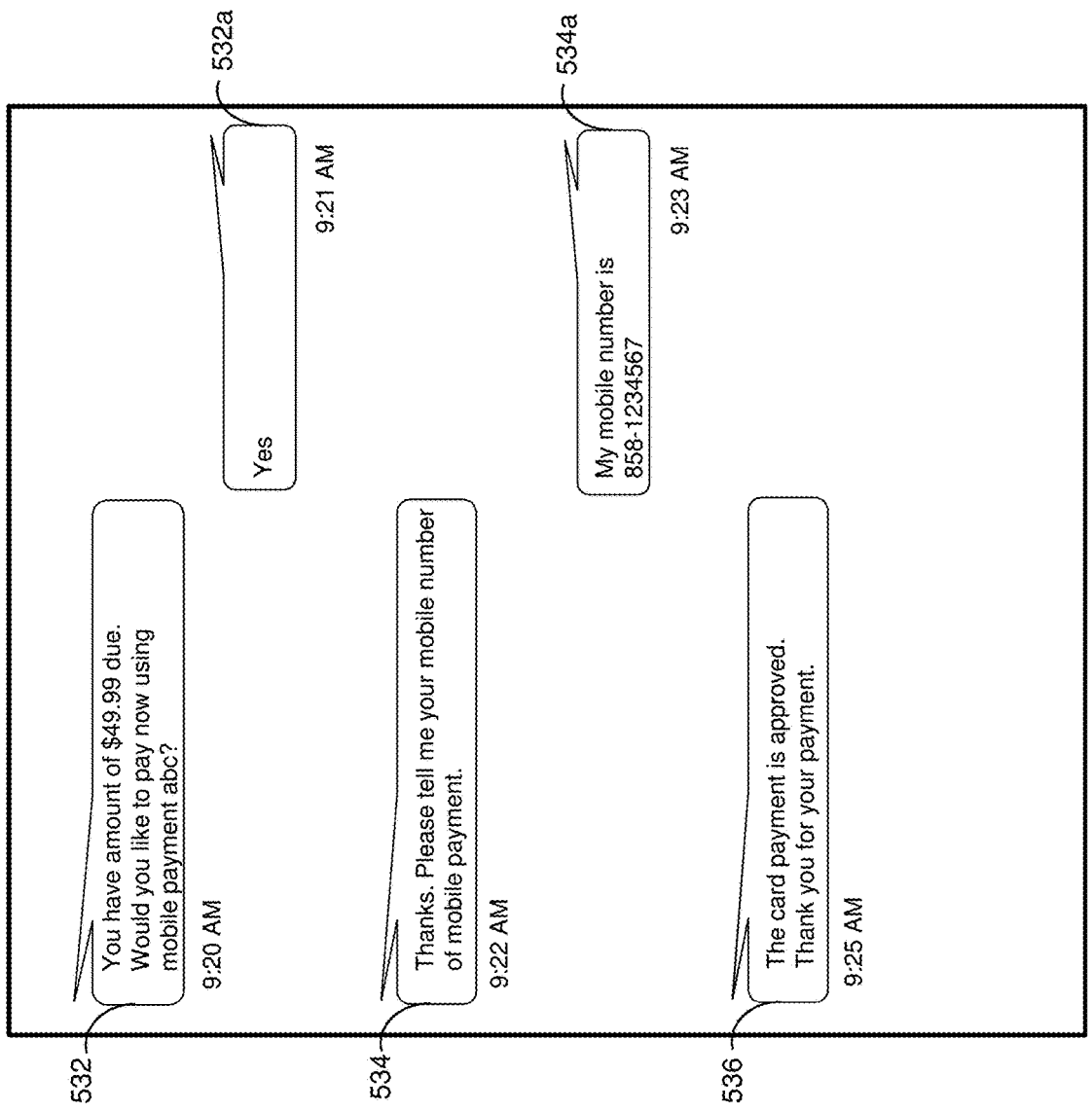
FIG. 12 illustrates an example of chatting messages exchanged as displayed by a PC.

Referring to FIG. 12 an example of text chatting messages exchanged as displayed by PC 512 is illustrated with respect to second system architecture 500. The messages tagged with reference numbers without suffix "a" is from Chatbot system 510 while the messages tagged with reference numbers having a suffix "a" are from the customer. The process illustrated in FIG. 12 includes a preamble that the customer connects using PC 512 to the merchant through Chatbot system 510. PC 512 pops up a chatting window and Chatbot system 510 can provide initial greetings with the customer. Then Chatbot system 510 requests and receives an account number, a bill transaction number or product number or name of purchase (the purchase process may need customer to provide shipping address if it is not in the account number), from PC 512. With the account number, bill transaction number or product number or name of purchase, Chatbot system 510 can also retrieve the payment amount due from the customer billing database of the merchant. An example of chatting messages exchanged and associated procedures are as follows:

In messages 532 and 532a, Chatbot system 510 sends a chatting message for the payment amount due and ask if customer wants to use the mobile payment method of this invention and receives a chatting message response that the customer selects to use the mobile payment method of this invention to pay for the payment due in the chatting window.

In messages 534 and 534a, Chatbot system 510 sends a chatting message to ask the customer for the mobile number for the mobile payment and receives a response from the customer the mobile number in the chatting window. After the customer types in the mobile number, Chatbot system 510 receives the mobile number and sends to messages mobile payment server 525 to process the transaction using steps similar to steps 4-16 in FIG. 7.

In message 536, Chatbot system 510 sends a chatting message to show that the payment is approved.

FIG. 12 has a similar procedure as FIG. 7 except Chatbox system 510 replaces IVR system 310, chatting messages are used instead of voice signals and telephone keypad tones, and customer phone device 322 is customer PC 512.

Alternatively, in FIG. 12, if the customer registers a mobile number of mobile payment already, then Chatbot system 510 can use the database to retrieve a registered mobile number for mobile payment. Chatbot system 510 can ask the customer to confirm in a chatting message, e.g., "Would you like to use mobile number 858-1234567 on the record to pay?" and receive confirmation from the customer before using the registered mobile number. In case the customer does not agree, Chatbot system 510 still needs to make a request for mobile number as in Message 534 in FIG. 12.

Figure 13:
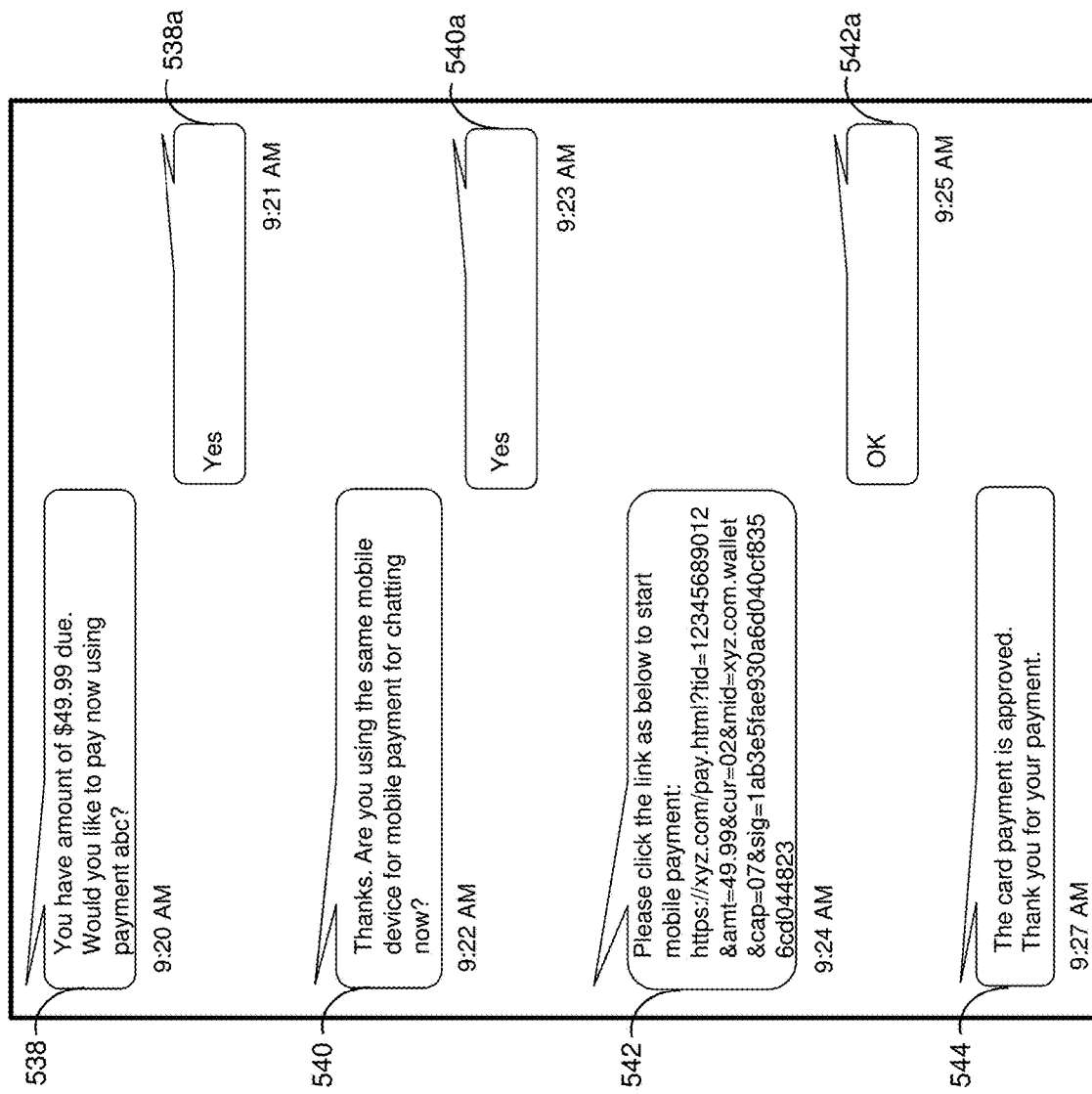
FIG. 13 illustrates an example of chatting messages exchanged between the Chatbot system and the PC.

FIG. 13 shows an example of chatting messages exchanged between Chatbot system 510 and PC 512. The messages tagged by a reference number without suffix "a" is from Chatbot system 510. The messages tagged by a reference number with suffix "a" are from the customer.

The process, a portion of which is illustrated in FIG. 13 has same preamble as in FIG. 12. An example of chatting messages exchanges and associated procedures are as follows:

In messages 538 and 538a Chatbot system 510 sends a chatting message for the payment amount due and ask if customer wants to use the mobile payment method of this invention and receives a chatting message response that the customer selects to use the mobile payment method of this invention to pay for the payment due in the chatting window.

In messages 540 and 540a, Chatbot system 510 sends a chatting message to ask if the customer is using the same mobile device for mobile payment for chatting now and receives chatting message reply. After Chatbot system 510 receives a response that the same mobile device for mobile payment is used for chatting now, Chatbot system 510 requests a URL, as in steps 4-6 in FIG. 14, from mobile payment server 525.

In messages 542 and 542a, Chatbot system 510 sends a chatting message to request the customer to click a URL to start payment. Customer confirms optionally and clicks the URL to start payment authorization.

In message 544, after Chatbot system 510 receives authorization, Chatbot system 510 sends a chatting message to show that the payment is approved and thank for payment.

Alternatively, the URL in Message 542 can reduce character string length by not including merchant-specific information, e.g. currency code, merchant identity, and cap. Alternatively, the URL in message 542 can only include transaction identity.

If the customer answers in message 540a "No" in FIG. 13, Chatbot system 510 can send message 534 of FIG. 12 to request for the mobile number for the mobile payment and receives reply in message 534 of FIG. 12. Then the remaining procedures in FIG. 12 are used.

Figure 14:
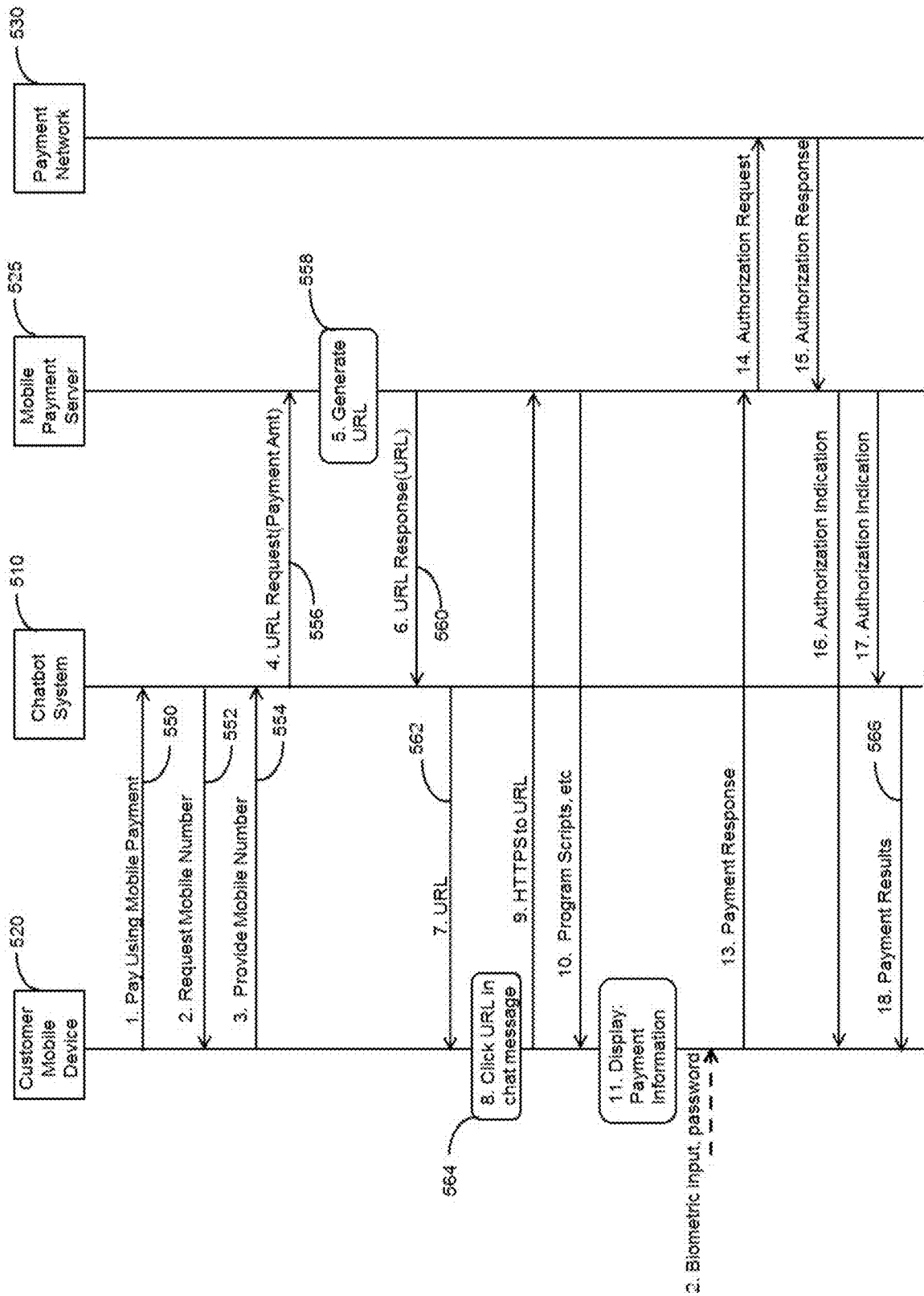
FIG. 14 is a schematic of the message exchange between elements of the payment system of FIG. 11, according to the present invention.

Turning now to FIG. 14, an example of the message flow of the mobile payment procedure utilizing Chatbot system 510, is illustrated. The procedure in FIG. 14 has the same preamble as in FIG. 12. The remaining procedures steps are as follows.

In step 1, Chatbot system 510 sends 552 a chatting message for the payment amount due, ask if customer wants to use the mobile payment method of this invention and receives a chatting message response that the customer selects to use the mobile payment method of this invention to pay for the payment due.

In step 2, Chatbot system 510 sends 552 a chatting message to the customer PC (in this case mobile device 520) to ask if the customer is using the same mobile device 520 for the mobile payment and for chatting messages.

In step 3, Chatbot system 510 receives 554 a response in a chatting message that the same mobile device is being used for both the mobile payment and for chatting messages.

In step 4, Chatbot system 510 sends 556 a request message to mobile payment server 525 to provide a URL. The request message includes payment amount, etc.

In step 5, mobile payment server 525 creates 558 a URL (Uniform Resource Locator) link that identifies mobile payment server 525. The URL link also includes transaction information, e.g. transaction identity (TID), and/or payment information (e.g. transaction amount, currency code, merchant identity, merchant supported brand networks, etc.) and message authentication code, e.g. a signature using crypto hash, to protect the integrity of the transaction information.

In step 6, mobile payment server 525 replies 560 by sending the URL to Chatbot system 510.

In step 7, Chatbot system 510 sends 562 a chatting message to mobile device 520 to display URL and asks the customer to click the URL to initiate the payment.

In steps 8, the customer clicks 564 the URL on the chatting window of mobile device 520.

Steps 9-17 in FIG. 14 are identical with steps 8-16 of the procedure illustrated in FIG. 7, except that Chatbot system 510 replaces IVR system 310.

In step 18, Chatbot system 310 sends 566 a chatting message to mobile device 520 to indicate that payment is approved and thank for payment.

Chatbot system 510 can also store a cookie with a unique identity in the customer PC or mobile device 520 to remember the status after the mobile payment completes successfully. For example, Chatbot system 510 can store the unique identity of the cookie and the following status information:

Whether or not the same mobile device for mobile payment is used for chatting.

The mobile number for mobile payment is for a different mobile device used for the mobile payment that the device used for chatting.

In follow on uses, when Chatbot system 510 receives a chatting session request from the customer's PC, Chatbot system 510 can read the identity of the cookie in the customer's PC or mobile device and retrieve the status information from the database. Therefore, Chatbot system 510 does not ask questions of the same mobile device for mobile payment used for chatting in messages 540 in FIG. 13 and mobile number in messages 534 in FIG. 12. Chatbot system 510 can skip messages 540 and 540*a* and jump to message 536 in FIG. 13 and FIG. 12, respectively, after performing procedures required for mobile payment, e.g. FIG. 14 in case of FIG. 13.

The URL link can also be encoded in QR code which can be scanned using a camera of another mobile device different from PC 512 to set up an HTTPS connection to extract the URL. Modern mobile phones can provide QR code scanner by default in the operating system without installing a mobile application; otherwise a mobile device would need to download a mobile app for this function.

Figure 15:
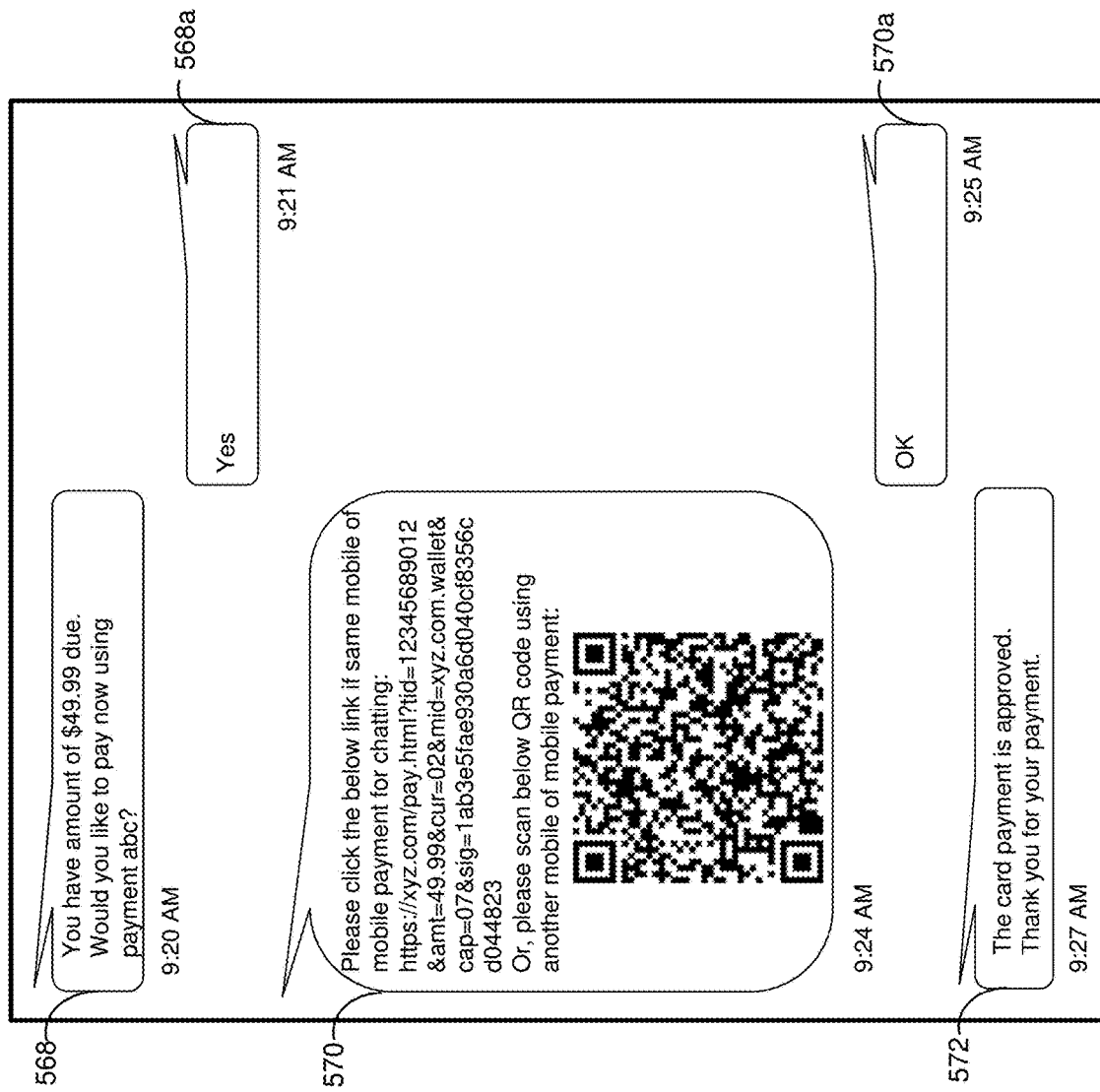
FIG. 15 shows an example of text exchanged as shown on customer's PC in a procedure using QR codes.

FIG. 15 shows an example of text exchanged as shown on customer's PC in a procedure using QR codes which can cover both cases of using the same device or different devices for mobile payment and chatting. Messages are designated by a reference number without suffix "a" for Chatbot system 510 and messages designated by a reference number with suffix "a" for the customer. The procedure shown in FIG. 15 has the same preamble as in FIG. 12. An example of text exchanges and associated procedures are as follows:

In messages 568 and 568*a*, the messages are the same as those in FIG. 12.

In messages 570 and 570*a*, Chatbot system 510 receives a URL and also generates a QR code of the URL with transaction information or payment information. Chatbot system 510 sends an instruction text and the QR code to request the customer click the URL if the customer uses the same mobile device for mobile payment and for chatting, or requests that the customer scan the QR code if the customer is using another mobile device for mobile payment that is different than the device used for chatting. The customer confirms optionally and clicks the URL link or scans the QR code using the camera from mobile device 520 whereby mobile device 520 can then send a HTTPS setup request to mobile payment server 525.

Mobile payment server 525 (and Chatbot system 510) can perform steps 9-18 in FIG. 14.

In message 572, after Chatbot system 510 receives authorization, Chatbot system 510 sends a chatting message to show that the payment is approved and thank for payment.

Alternatively, the URL in message 570 can reduce the character string length by not including merchant-specific information, e.g. currency code, merchant identity, and cap. Alternatively, the URL in message 570 can only include transaction identity.

The above messages exchanged in chatting as discussed in FIG. 12-15 can be provided by chatbot system 510. Alternatively, chatbot system 510 can even reuse available chatting platform, e.g. Skype, WhatsApp, LINE, Microsoft Team, Facebook, Twitter, etc.

Figure 16:
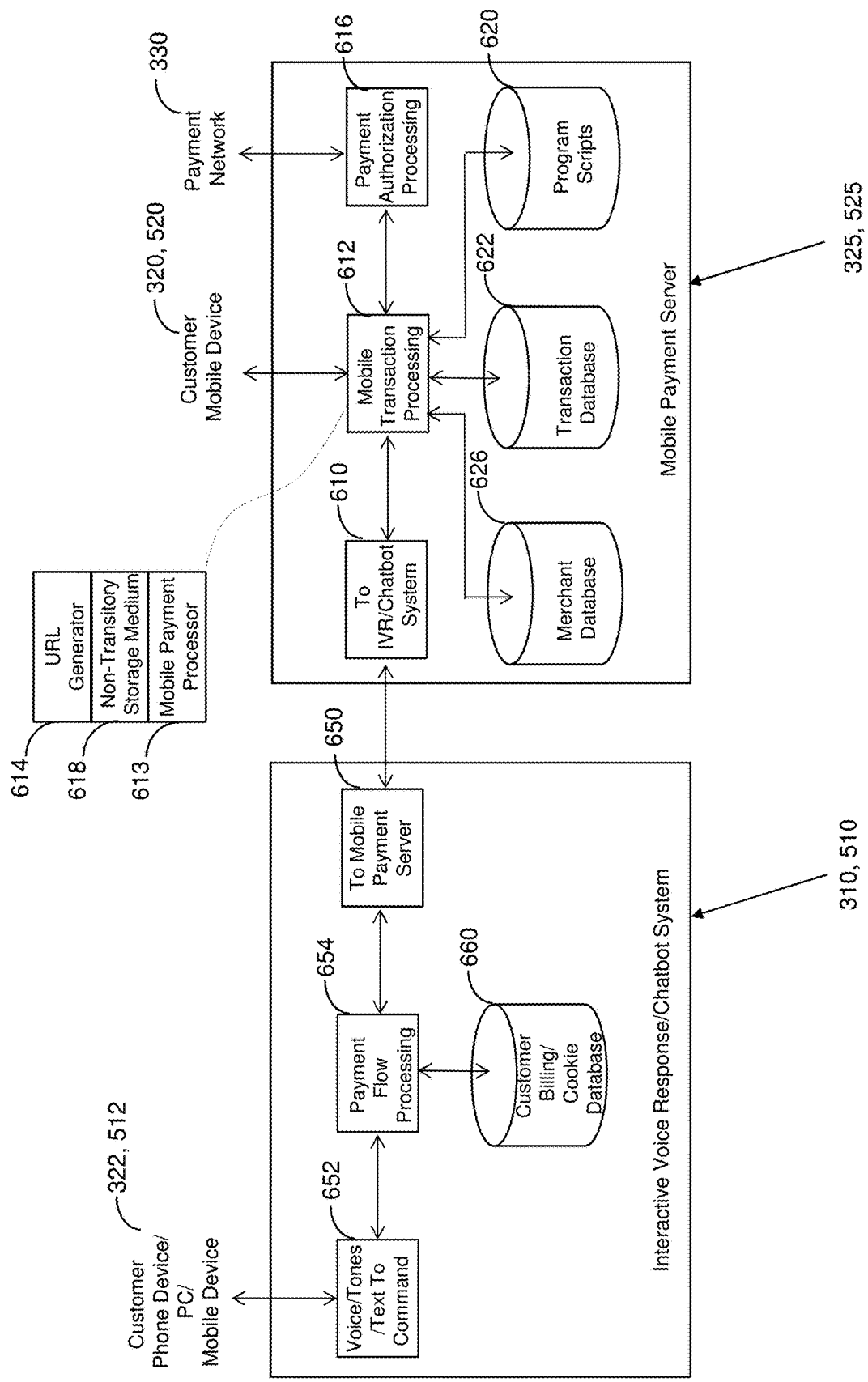
FIG. 16 a simplified schematic of an example of functional modules in the IVR/Chatbot system and mobile payment server, is illustrated.

Turning now to FIG. 16, an example of functional modules in IVR/Chatbot system 310, 510 and mobile payment server 325, 525 is illustrated. Mobile payment server 325, 525, for example, includes an IVR/Chatbot system interface module 610 which receives the mobile number, payment amount, etc. from IVR/Chatbot system 310, 510 and sends authorization indication with approval or reject to IVR/Chatbot system 310, 510. A mobile transaction processing module 612 receives the mobile number, transaction information, e.g. payment amount, currency code, merchant Id, merchant supported brand networks, merchant name, summary of bill or purchase information, transaction identity, message authentication code, etc. Mobile transaction processing module 612 includes a mobile payment processor 613 and a URL generator 614 which generates an URL link with the transaction information or payment information. Mobile transaction processing module 612 sends an SMS to customer mobile device 320, 520 using the mobile number, receives HTTPS requests from customer mobile device 320, 520 and sets up HTTPS sessions therewith to download program scripts, validation token, and detailed payment information to mobile device 320, 520. Mobile transaction processing module 612 receives encrypted payment data from mobile device 320, 520 and sends the encrypted payment data to payment authorization processing module 616. It sends an authorization indication with the results to IVR/Chat system 310, 510, and handles error cases, e.g. customer declines the payment or timer expiry. Mobile transaction processing module 612 includes and is directed by a non-transitory computer readable storage medium 618 that is not a signal, storing computer executable instructions that when executed by mobile transaction processor 613 cause the mobile payment server 325 to effectuate operations for processing mobile payments as described previously.

Payment authorization processing module 616 is coupled to mobile transaction processing module 612 and payment network 330. It receives encrypted payment data from mobile transaction processing module 612, sends an authorization request to payment network 330, receives a response, and notifies mobile transaction processing module 612 with the authorization response.

A program scripts module 620 stores program scripts, e.g. Java scripts, for different wallet service providers, and forwards the program scrips to mobile transaction processing module 612 to send to mobile device 320, 512.

A transaction database module 622 stores transaction information, e.g. payment amount, currency code, merchant Id, merchant supported brand networks, transaction identity, message digest, etc., and also stores transaction authorization results of each transaction. Upon request by mobile transaction processing module 612, it can retrieve detailed payment information by using the transaction identity.

A merchant database module 626 stores the merchant profile data, e.g. merchant Id, currency code, merchant name, merchant supported networks, etc., when mobile payment server 325, 525 is owned by a third party and provides services to multiple merchants. Upon request by mobile transaction processing module 612, it can retrieve profile of merchant for creating URL or downloading detailed payment information.

Still referring to FIG. 16, IVR/Chatbot system 310, 510 includes a mobile payment server interface module 650 which sends mobile number, payment amount, etc. to mobile payment server 325, 525 and receives the authorization indication with approval or rejection results. A Voice/Tones/Text command module 652 plays voice signals to phone device 322 or mobile device 320 to ask the customer if the mobile payment method of this invention is to be used. It can receive responses of voice signals or telephone keypad tones, translate them to a command and send them to a payment flow processing module 654. Voice/Tones/Text command module 652 can also send chatting message text to PC 512 or mobile device 520 to ask the customer the mobile payment method of this invention is to be used and receiving a response in text in the chatting window.

Payment flow processing module 654 sends commands to Voice/Tones/Text module to play voice signals according to payment processing flow. Payment flow processing module 654 receives signals from Voice/Tones/Text module 652 of the response from the customer for the payment processing flow. It sends mobile number, payment amount, etc. to mobile payment server 325, receive authorization indication with approval or reject results from mobile payment server 325, and generates a QR code from character string version of URL (alternatively QR code can come from mobile transaction processing module 612 of mobile payment server 325, for example). When Chatbot system 510 is employed, payment flow processing module 654 can use status information associated with a cookie to decide the payment flow.

A customer billing/cookie database module 660 stores a payment amount due for the account number, a bill transaction number for the bills and purchases, provides payment amount upon request by payment flow processing module 654, and stores the registered mobile number for mobile payment through customer's registration for the account. When IVR system 310 is employed, customer billing/cookie database module 660 archives the mobile number for mobile payment associated with caller ID through customer success in mobile payment. When Chatbot system 510 is used, it stores status information for a cookie identity, where status information can include whether same mobile device for mobile payment is used for chatting and mobile number if provided. It also provides status information associated with a cookie identity.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A mobile payment method comprising the steps of:
    making a mobile payment request by a customer to an automated response system of a merchant store for a purchase;
    providing, by the customer, a mobile number of a mobile device, having mobile payment capability, to the automated response system;
    establishing communication, by the automated response system, to a mobile payment server coupled to a payment network;
    the mobile payment server programmed to effectuate the operations of:
    receiving payment information including the mobile number and the payment amount from the automated response system;
    creating a Uniform Resource Locator (URL) link, the URL link containing transaction information including information required by a mobile wallet Application Programming Interface (API) used in the transaction;
    sending the URL link to the mobile device;
    using the URL link to establish a Hypertext Transfer Protocol Secure (HTTPS) session with the mobile device;
    downloading a program script and validation token to the mobile device in the HTTPS session; and
    receiving encrypted payment data from the mobile device and sending the encrypted data to the payment network.

2. The mobile payment method as claimed in claim 1, wherein the step of receiving encrypted payment data includes the program script downloaded by the mobile device retrieving the payment related information embedded in the URL link, interacting with a mobile payment core of the mobile device, and using the retrieved payment related information from the URL link to generate the encrypted payment data.

3. The mobile payment method as claimed in claim 1, wherein the step of using the URL link to establish a Hypertext Transfer Protocol Secure (HTTPS) session with the mobile device includes the steps of:
    the mobile device displaying the URL link; and
    the customer selecting the URL link.

4. The mobile payment method as claimed in claim 1 wherein the step of making a mobile payment request by a customer to an automated response system includes the automated response system being one of an interactive voice response system and a Chatbot system.

5. The mobile payment method as claimed in claim 1 wherein the step of sending the URL link includes using one of a Short Message Service (SMS) using the mobile number and a Multimedia Message Service (MMS) using the mobile number.

6. The mobile payment method as claimed in claim 1 wherein the transaction information includes a transaction identity, a transaction amount, a currency code, a merchant identity, supported networks and a message signature.

7. The mobile payment method as claimed in claim 1 wherein the step of making a mobile payment request by a customer to an automated response system of a merchant store for a purchase includes the step of using one of a customer phone device and the mobile device.

8. A mobile payment system, comprising:
- a mobile payment server having a mobile payment processor, the mobile payment server serving an automated response system and a mobile device through a network;
- a non-transitory computer readable storage medium that is not a signal, storing computer executable instructions that when executed by the mobile payment server cause the mobile payment processor to effectuate operations comprising:
  a) receiving payment information including a mobile number and a payment amount from the automated response system;
  b) creating a Uniform Resource Locator (URL) link, the URL link containing transaction information including information required by a mobile wallet Application Programming Interface (API) used in the transaction;
  c) sending the URL link to the mobile device;
  d) using the URL link to establish a Hypertext Transfer Protocol Secure (HTTPS) session with the mobile device;
  e) downloading a program script and validation token to the mobile device in the HTTPS session; and
  f) receiving encrypted payment data from the mobile device and sending the encrypted data to the payment network.

9. The mobile payment system as claimed in claim 8 wherein the automated response system includes one of an interactive voice response system and a Chatbot system.

\* \* \* \* \*